US007938598B2

(12) United States Patent
Roodenburg et al.

(10) Patent No.: US 7,938,598 B2
(45) Date of Patent: May 10, 2011

(54) MARINE PIPELINE INSTALLATION SYSTEM AND METHODS

(75) Inventors: Joop Roodenburg, Delft (NL); Anne Klaas De Groot, Sugar Land, TX (US); Diederick Bernardus Wijning, Schiedam (NL); Terence Willem August Vehmeijer, Den Haag (NL)

(73) Assignee: Itrec B.V., Schiedam (NL)

(*) Notice: Subject to any disclaimer, the term of this patent is extended or adjusted under 35 U.S.C. 154(b) by 101 days.

(21) Appl. No.: 12/225,365

(22) PCT Filed: Mar. 22, 2006

(86) PCT No.: PCT/NL2006/000153
§ 371 (c)(1),
(2), (4) Date: Feb. 13, 2009

(87) PCT Pub. No.: WO2007/108673
PCT Pub. Date: Sep. 27, 2007

(65) Prior Publication Data
US 2010/0232884 A1    Sep. 16, 2010

(51) Int. Cl.
*F16L 1/15*    (2006.01)
*F16L 1/23*    (2006.01)
(52) U.S. Cl. .................. 405/168.4; 405/168.1; 405/170; 405/173
(58) Field of Classification Search .................. 405/158, 405/166, 167, 168.1, 168.2, 168.3, 168.4, 405/169, 170, 173
See application file for complete search history.

(56) References Cited

U.S. PATENT DOCUMENTS

| | | | | |
|---|---|---|---|---|
| 4,721,410 A * | 1/1988 | Recalde | ...................... | 405/168.3 |
| 4,789,108 A | 12/1988 | Recalde | | |
| 5,011,333 A | 4/1991 | Lanan | | |
| 6,361,250 B1 * | 3/2002 | de Varax | ...................... | 405/168.3 |
| 6,702,519 B2 * | 3/2004 | Stockstill | ................... | 405/168.3 |

(Continued)

FOREIGN PATENT DOCUMENTS

EP    0 717 221 A1    6/1996
(Continued)

*Primary Examiner* — Frederick L Lagman
(74) *Attorney, Agent, or Firm* — Birch, Stewart, Kolasch & Birch, LLP

(57) ABSTRACT

A marine pipeline installation system for laying an offshore pipeline and/or installing a subsea riser, the system at least allowing to carry out the reel lay method, wherein the system comprises:
one or more storage reels for storage of pipeline,
a pipeline launch tower adapted for launching the pipeline in the direction of the sea,
a pipeline guide at an elevated position for guiding said pipeline to a pipeline launch trajectory along said tower,
one or more tensioners, each tensioner comprising a tensioner frame and multiple tracks supported by said tensioner frame, said tracks being adapted for engaging the pipeline and supporting at least part of the weight of the launched pipeline,
the tensioner frame being supported by said tower via an associated support assembly.
The support assembly of at least one tensioner frame, preferably of all tensioner frames, is adapted to allow for displacement of the tensioner frame between an active position, wherein the pipeline launch trajectory extends through the tensioner frame between the tracks, so that the tracks can engage on a pipeline, and a retracted and non-operable position.

20 Claims, 22 Drawing Sheets

U.S. PATENT DOCUMENTS

| | | | |
|---|---|---|---|
| 6,733,208 B2 * | 5/2004 | Stockstill | 405/168.3 |
| 7,029,206 B2 * | 4/2006 | Stockstill | 405/168.3 |
| 2003/0044235 A1 * | 3/2003 | Stockstill | 405/166 |
| 2003/0091395 A1 * | 5/2003 | Stockstill | 405/166 |
| 2005/0036842 A1 * | 2/2005 | Stockstill | 405/168.3 |
| 2006/0188341 A1 * | 8/2006 | Stockstill | 405/168.3 |
| 2007/0258772 A1 * | 11/2007 | Bursaux et al. | 405/168.3 |
| 2008/0170911 A1 * | 7/2008 | Snowdon et al. | 405/166 |
| 2010/0040417 A1 * | 2/2010 | Bursaux et al. | 405/166 |

FOREIGN PATENT DOCUMENTS

| | | |
|---|---|---|
| GB | 2 346 188 A | 8/2000 |
| GB | 2 398 762 A | 9/2004 |
| WO | WO-02/055836 A1 | 7/2002 |
| WO | WO-03/060366 A2 | 7/2003 |
| WO | WO-2004/068012 A2 | 8/2004 |
| WO | WO-2005/095835 A1 | 10/2005 |
| WO | WO-2006/085739 A1 | 8/2006 |

* cited by examiner

MARINE PIPELINE INSTALLATION SYSTEM AND METHODS

The present invention relates to the field of marine pipeline installation.

From the prior art reel lay vessels are known for laying a pipeline on the seabed according to the reel lay method.

These vessels commonly are equipped with one or more storage reels for storage of pipeline to be installed. The vessels also are equipped with a pipeline launch tower adapted for launching the pipeline in the direction of the seabed. Such a tower is often placed adjacent or over a moonpool of the vessel, or at another suitable location, e.g. at the stern of the vessel. In general the term tower here refers to a raised structure on the vessel.

It is also known to provide a pipeline guide at an elevated position on said tower providing a curved path for guiding said pipeline toward a pipeline launch trajectory along or within said tower. Known pipeline guides include a large diameter pipeline guide wheel or a semi-circular guide structure, e.g. provided with rollers or chains.

In known reel lay pipelaying systems one or more pipeline tensioners, commonly two but versions with one or three are also known, are supported by the tower at different heights below the curved or circular pipeline guide.

In a common design each pipeline tensioner has a tensioner frame and multiple tracks (also called caterpillars), often three or four tracks, supported by said tensioner frame. The tracks are adapted for engaging the pipeline and supporting at least part of the weight of the launched pipeline. In practice a single tensioner can be designed to support a pipeline weight of more than 50 tons, and tensioner capacities of more than 100 tons are also not uncommon.

The tracks are mounted in said tensioner frame in a movable manner in order to allow for adjustment of the gap between the tracks to accommodate various pipeline diameters.

It is also known from the prior art to design the tensioner frame "oversized" with respect to regular pipeline diameters, so that the gap between the tracks can be increased to a large size which allows for the passage of an accessory fitted on (the end of) or in the pipeline, e.g. a connector on the end of or in a flexible pipeline. Such connectors are bulky and have a diameter substantially greater than the pipeline diameter, e.g. having a diameter of more than 1 meter for connectors in flexible offshore pipeline.

The large loads acting on the tensioners require a sturdy design of the tensioner frame and also of the associated support assembly via which the tensioner frame is connected to the tower.

The present invention aims to provide an improved marine pipelaying system, or at least an alternative system.

The invention further aims to provide improved pipeline installation methods and systems therefor.

The present invention also relates to the installation of pipeline in the form of a subsea riser, e.g. between a wellhead and a vessel, drilling/production facility, etc.

The invention also aims to provide an improved riser installation system and method.

The present invention provides according to a first aspect thereof a system for marine pipeline installation, which is characterised in that the support assembly of at least one tensioner frame, preferably of all tensioner frames, is adapted to allow for displacement of the tensioner frame between an active position, wherein the pipeline launch trajectory extends through the tensioner frame between the tracks, so that the tracks can engage on the outside of the pipeline, and a retracted and non-operable position.

The invention thus allows to retract the entire assembly of a tensioner frame and track units mounted therein to a retracted position, so that a large "clear envelope" is created around the pipeline launch trajectory. This "clear envelope" or "zone" allows for the passage and/or placement of objects, within or through said envelope.

A relevant application of the retractability of the one or more tensioners, is that the retraction creates an envelope or space for receiving a pipeline accessory (or part of said pipeline accessory), which accessory will then be connected to the pipeline. So the pipeline accessory is then placed at the location where the tensioner would be when in its active position and the accessory is then held in said location while the pipeline accessory is fitted to the pipeline. As is preferred a static pipeline support device is provided at a level below the tensioner(s) to support the launched pipeline while the accessory is fitted thereto and one or all tensioners have been retracted and thus unable to assist in supporting the pipeline weight.

In a preferred embodiment it is envisaged that in the retracted position at least 1 meter distance is created between the pipeline launch trajectory and the assembly of tensioner frame and track units thereof, more preferably at least 2 meters.

It will be apparent to the man skilled in the art that e.g. an envelope having a minimum distance between pipeline launch trajectory and nearest by of the tensioner of 2 meters can only be obtained with great constructional difficulties in a prior art tensioner which only allows to move the track units in the frame apart. It would require a very large size frame and a very large "stroke" of the track units therein, which is a constructional problem in view of the loads that need to be absorbed by a tensioner in this field and the requirements on control of the pressure exerted on the pipeline when held by the tensioner.

It is noted that, as is known in the art, the tensioner frame can be, and preferably is, a frame which forms an "annular frame structure" extending around the pipeline launch trajectory in normal operation, within which frame structure the track units are mounted.

Also preferably the frame structure of the tensioner is of the type that allows to "open" the frame, as is known in the art, preferably the annular frame structure having at least one hinged frame part which can be moved between a "closed position", wherein the annular frame structure forms a closed annulus, and an "opened position", wherein the one or more hinged parts create a lateral opening in the frame structure over the height thereof, allowing for the lateral introduction and/or removal of a pipeline (or other item).

It is envisaged that the tensioner in its retracted position is held in a shape corresponding to a closed state of the tensioner (as is always true for a non-openable tensioner and can be realised with an openable frame structure type tensioner). Then the pipeline launch trajectory extends outside and spaced from said retracted tensioner frame.

It is also envisaged that with a tensioner having an openable frame structure to provide for a lateral opening therein, that the "clear envelope" is created by the combination of retraction of the frame structure and "opening" of the frame structure. This means that in the retracted position the tensioner frame is held "open" to create the "clear envelope". As will be shown below one can envisage that a tensioner frame of the annular frame type which comprises a central frame part, which is connected to the tower via a support assembly allowing for retraction of the frame, and two hinged frame parts, hinged on opposite sides of the central frame part and connectable by connection means at their free ends to obtain a closed annular frame during operation of the tensioner. It can then be envisaged that for creating the clear envelope the hinged parts are pivoted outwards so that they move apart, preferably such that their free ends are spaced apart at least 2 meters, and that also the central part is retracted, In such a manner lateral access to the clear envelope is created by the opening between the free ends of the hinged parts, and a free envelope is created around the pipeline launch trajectory.

The possibility to retract the one or more tensioners from their active position offers new options for the design and operation of the vessel. Also it allows for new and advantageous operations to be performed with the marine pipelaying system.

One relevant advantage for instance relates to operations wherein a large accessory is mounted in pipeline to be launched (e.g. a pipeline connector) or has to be mounted on the launched pipeline (e.g. a PLET (pipeline end terminal, buoy, etc). This will be explained in detail with reference to the appended drawings.

It can be envisaged that the system is used to install a pipeline on the seabed having multiple accessories included therein at spaced apart locations, e.g. wellhead components (such as a Christmas tree) connectable to different subsea wellbore at spaced apart locations, or other inline structures, etc.

The present invention further relates to embodiments wherein in addition to "reel lay" the system offers the possibility to perform "J-Lay" marine pipelaying operations. In this respect J-Lay is understood here as the method wherein a length of pipe (a pipe section) is brought above the upper end of the previously launched pipeline and connected, e.g. welded or screwed (when a threaded connection is used), thereto, after which the pipeline is lowered over a distance and a further pipe section is added to the top of the pipeline. In a preferred design the system can be easily changed between both lay methods.

An advantage of such a system that different types of pipes can be installed using the system in different "modes". This is for instance advantageous when operating in an oil or gas field where multiple types of pipe have to be installed. It avoids the use of multiple vessels, each for a specific pipelay method, in such a field.

This versatile system can for instance be employed for installing a riser of the type wherein an essentially vertical riser part extends upward from the seabed to a submerged buoy, and a further catenary riser part extends from said buoy to a vessel, e.g. a rig, FPSO, tanker loading point, etc. A riser of this type is e.g. disclosed in WO 02/055836 and GB 2346188(2H Offshore). A riser buoyancy module is e.g. disclosed in GB 2398762.

The vertical riser part of such a riser could then be installed from the vessel using the J-Lay technique, then the riser buoyancy module could be fitted and lowered into the sea (again using the same vessel), and then the catenary flexible riser part could be installed using the same vessel and the reel lay technique.

The pipeline to be installed using the inventive system could have a pipe-in-pipe structure as is known in the art. The J-Lay installation to be employed in the present invention could be configured to install "pipe-in-pipe" type of pipeline. Also the pipeline to be installed can be a bundle of pipelines, e.g. a main pipeline with piggy-backed smaller pipeline(s) or other elongated elements, e.g. an umbilical for control/operation of subsea equipment and/or a electrical cable and/or hydraulic hose.

The present invention also relates to methods for installing offshore pipelines using the system according to the present invention.

The invention will now be disclosed in more detail referring to preferred embodiments shown in the drawing.

Figure 1:
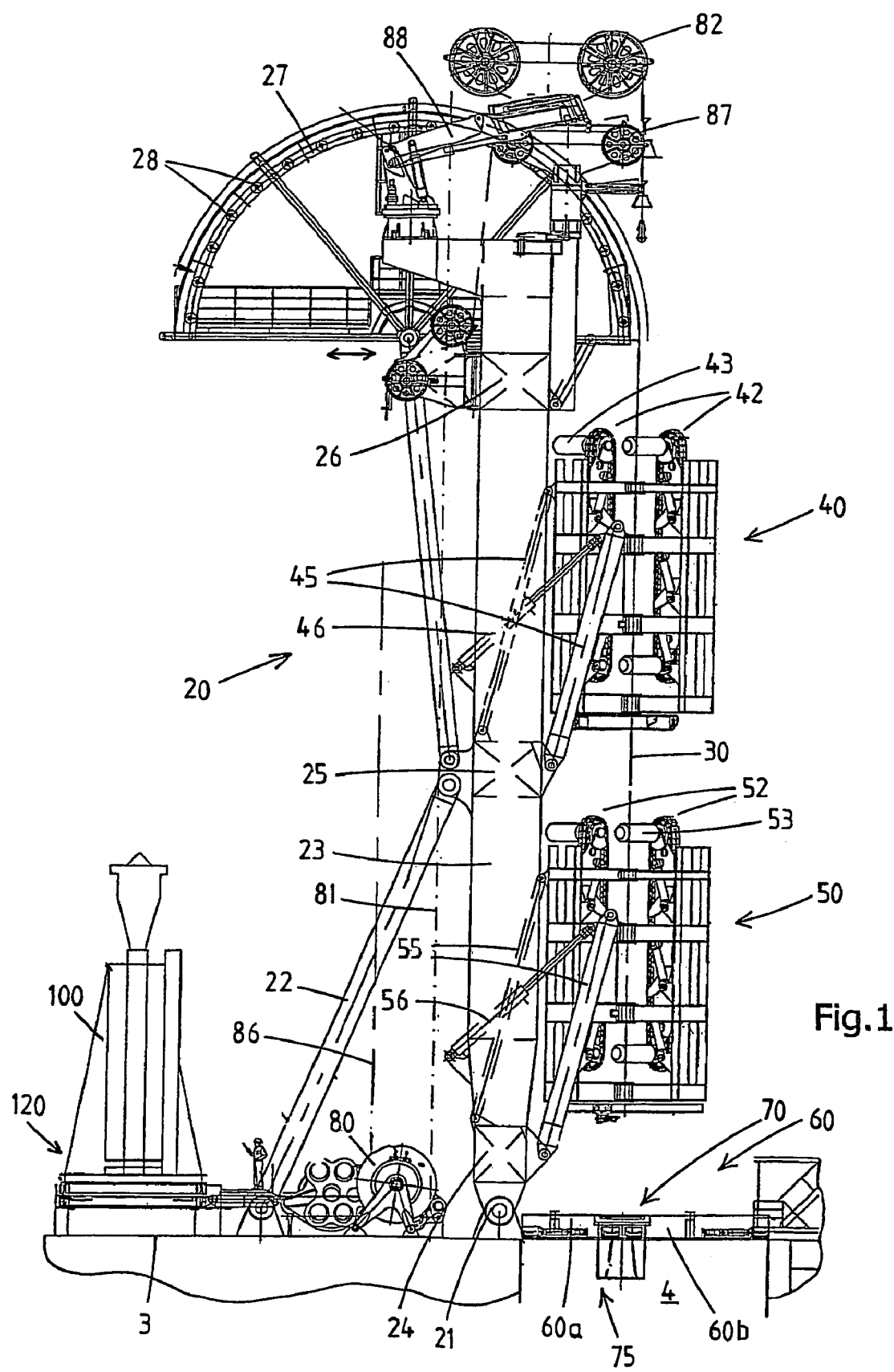
FIG. 1 shows in side view an example of a marine pipelaying system according to the invention.
Figure 4:
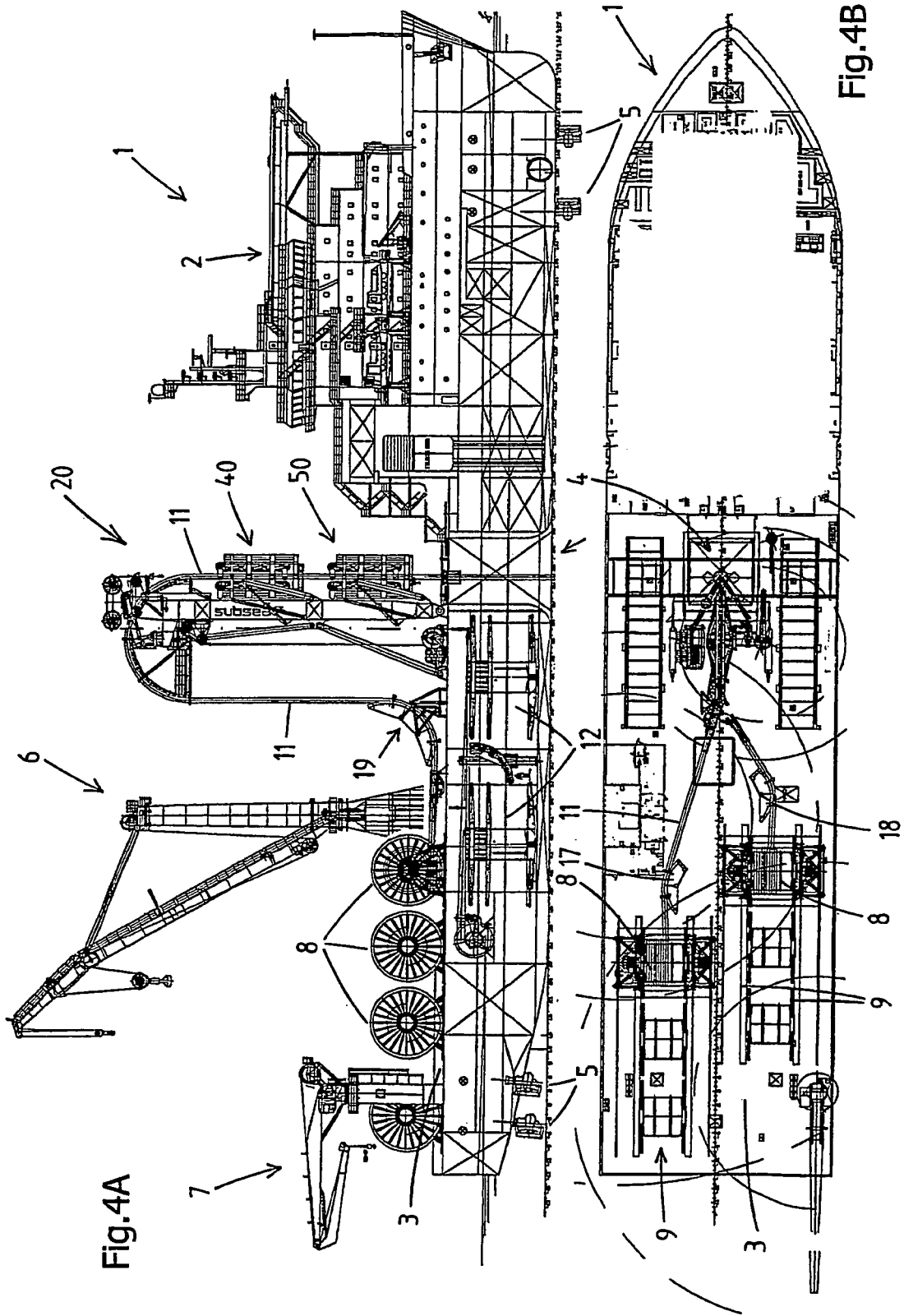
Figure 5:
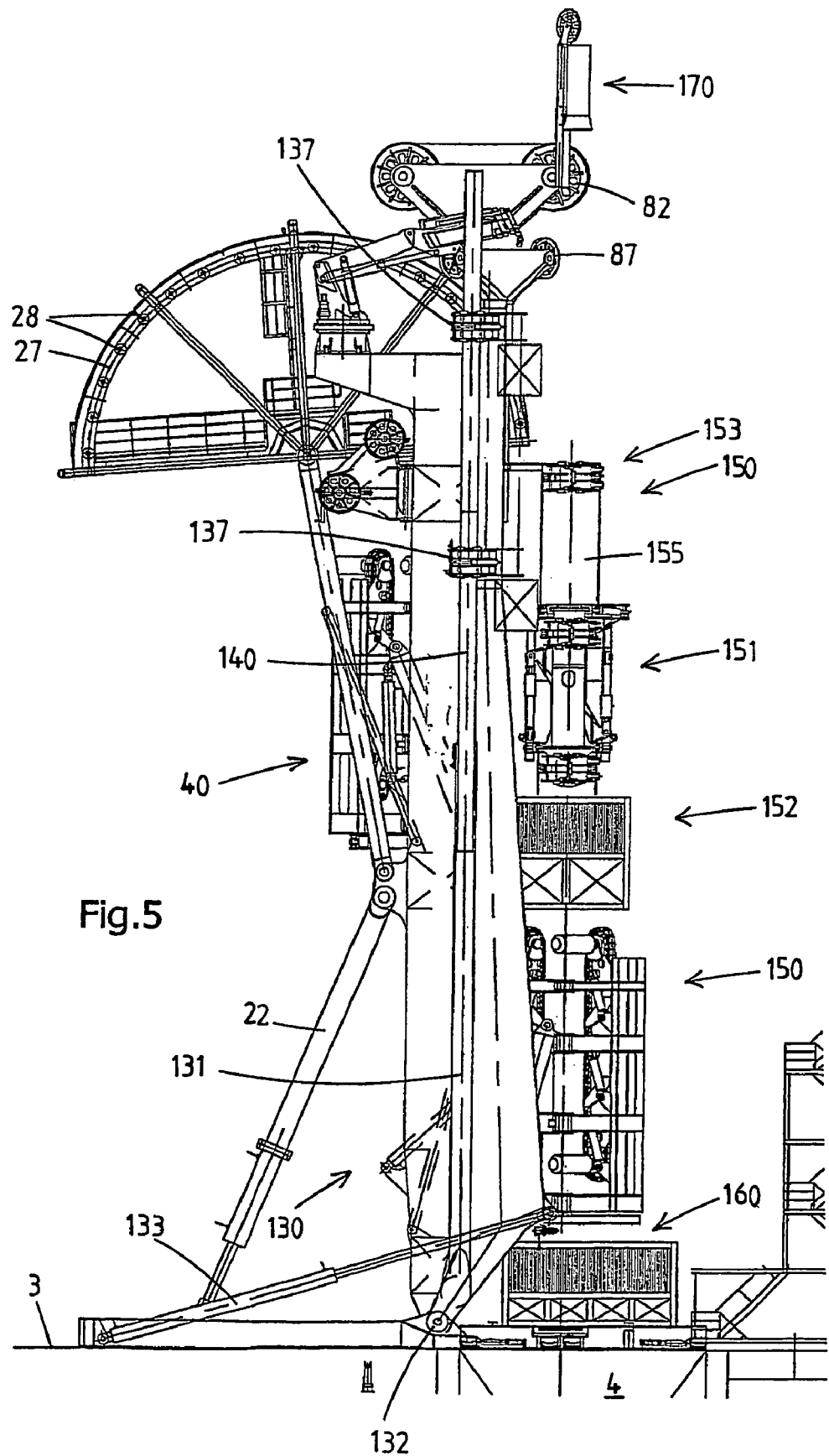
Figure 6:
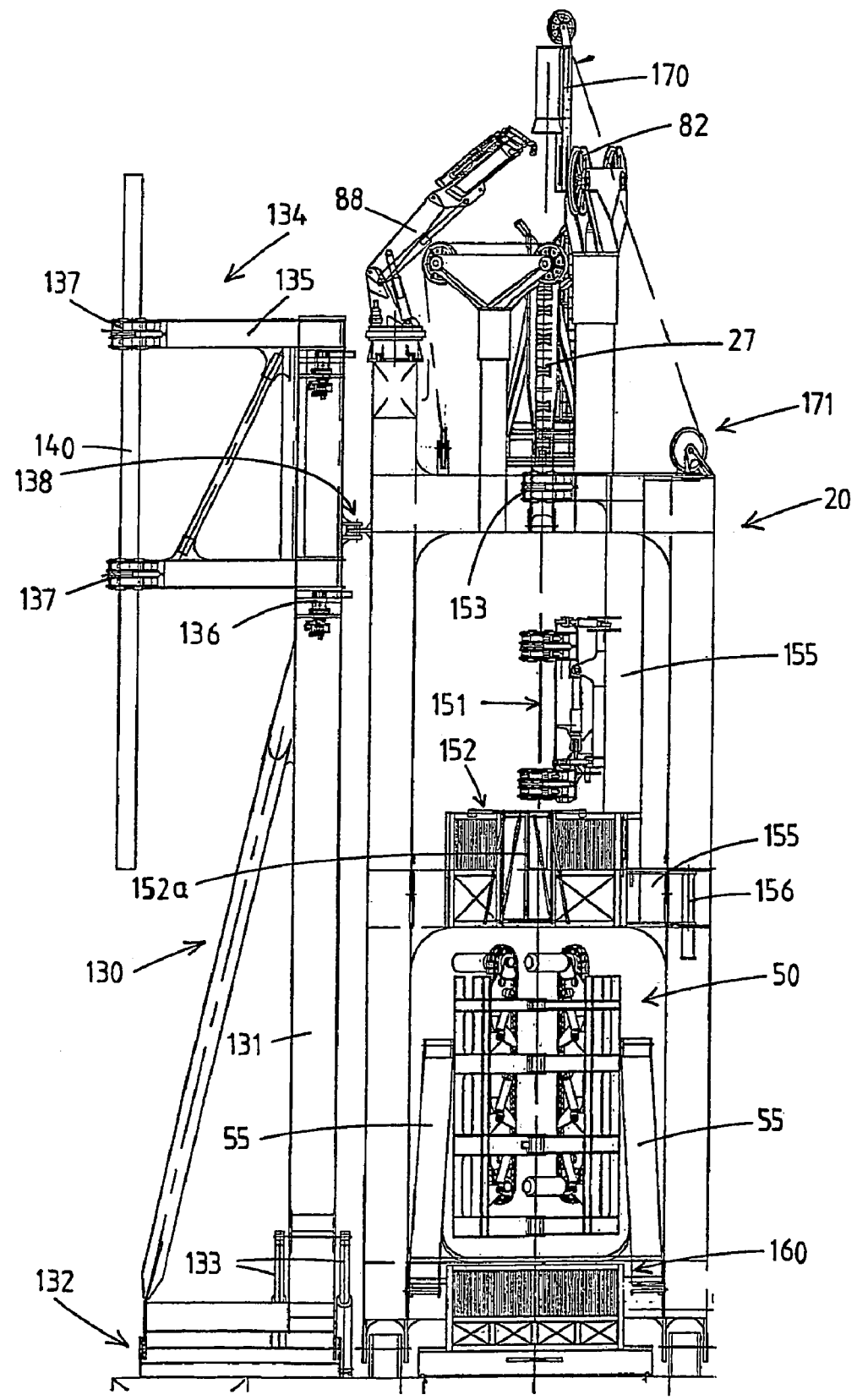
Figure 7:
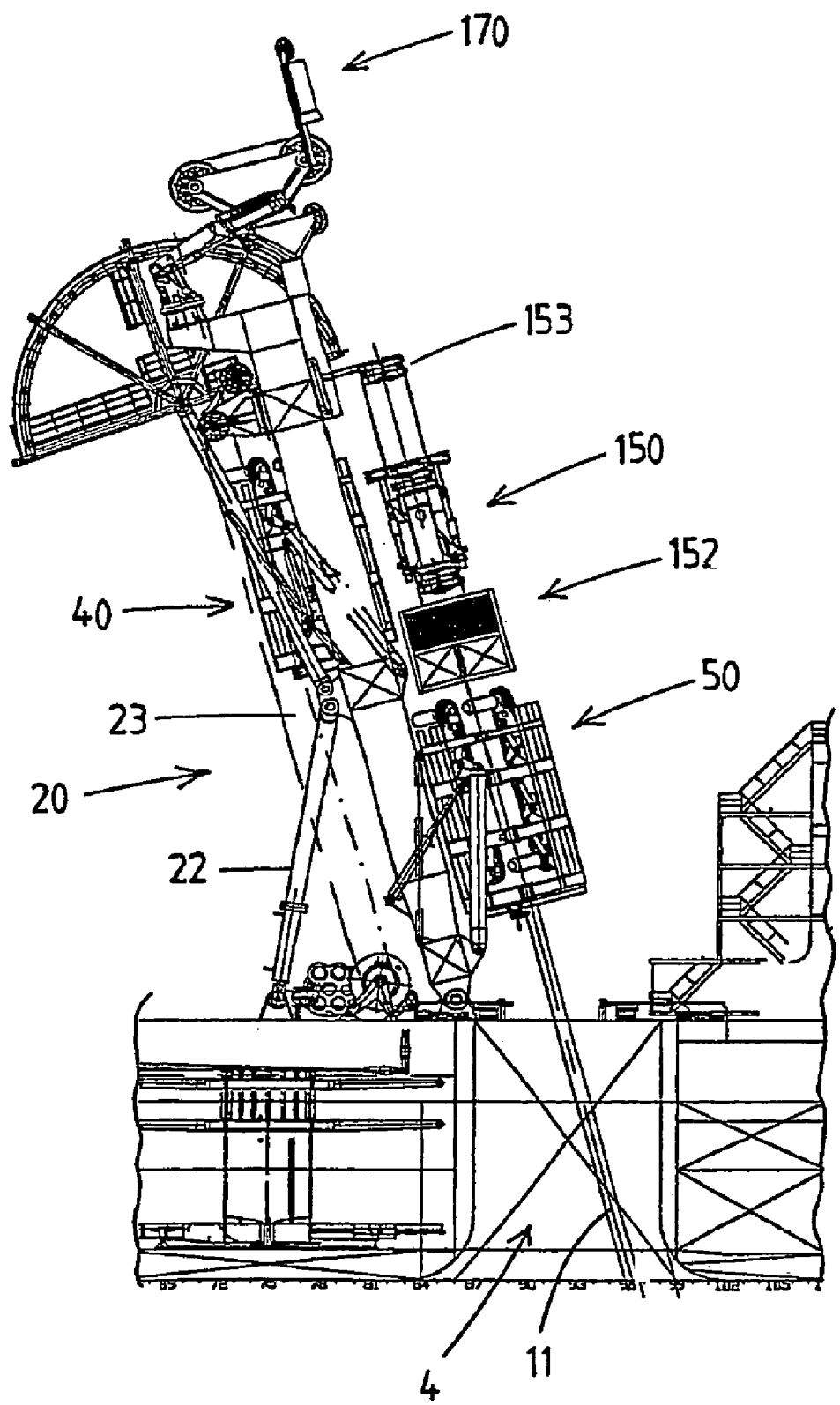
Figure 8A:
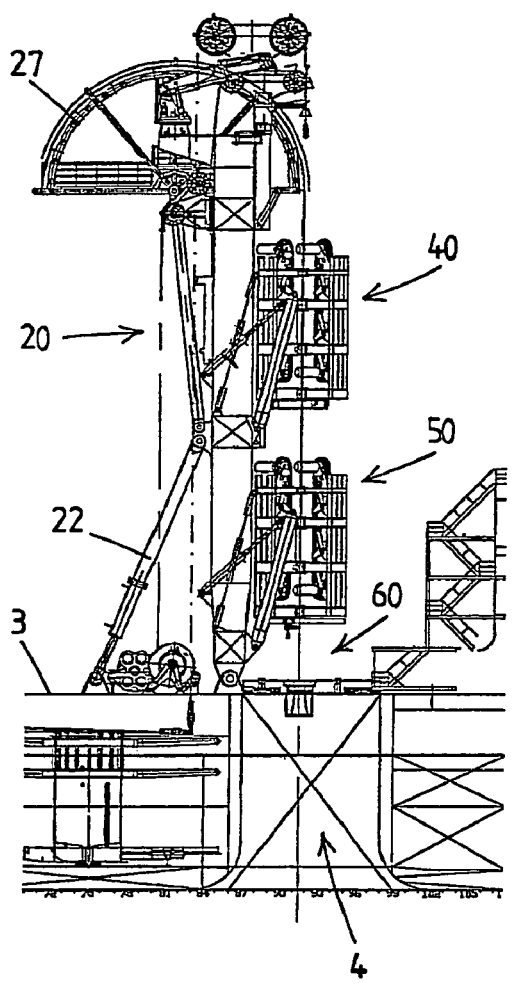
Figure 9:
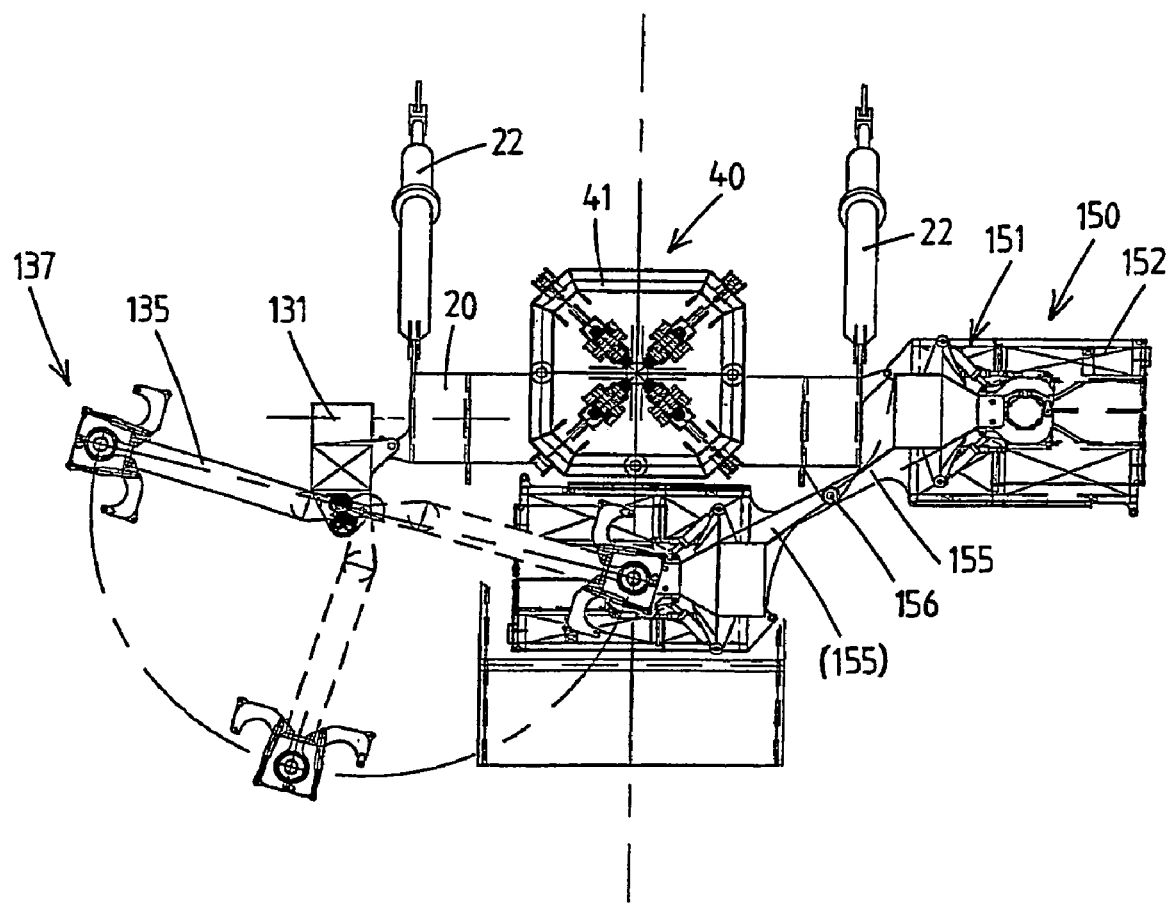
Figure 10:
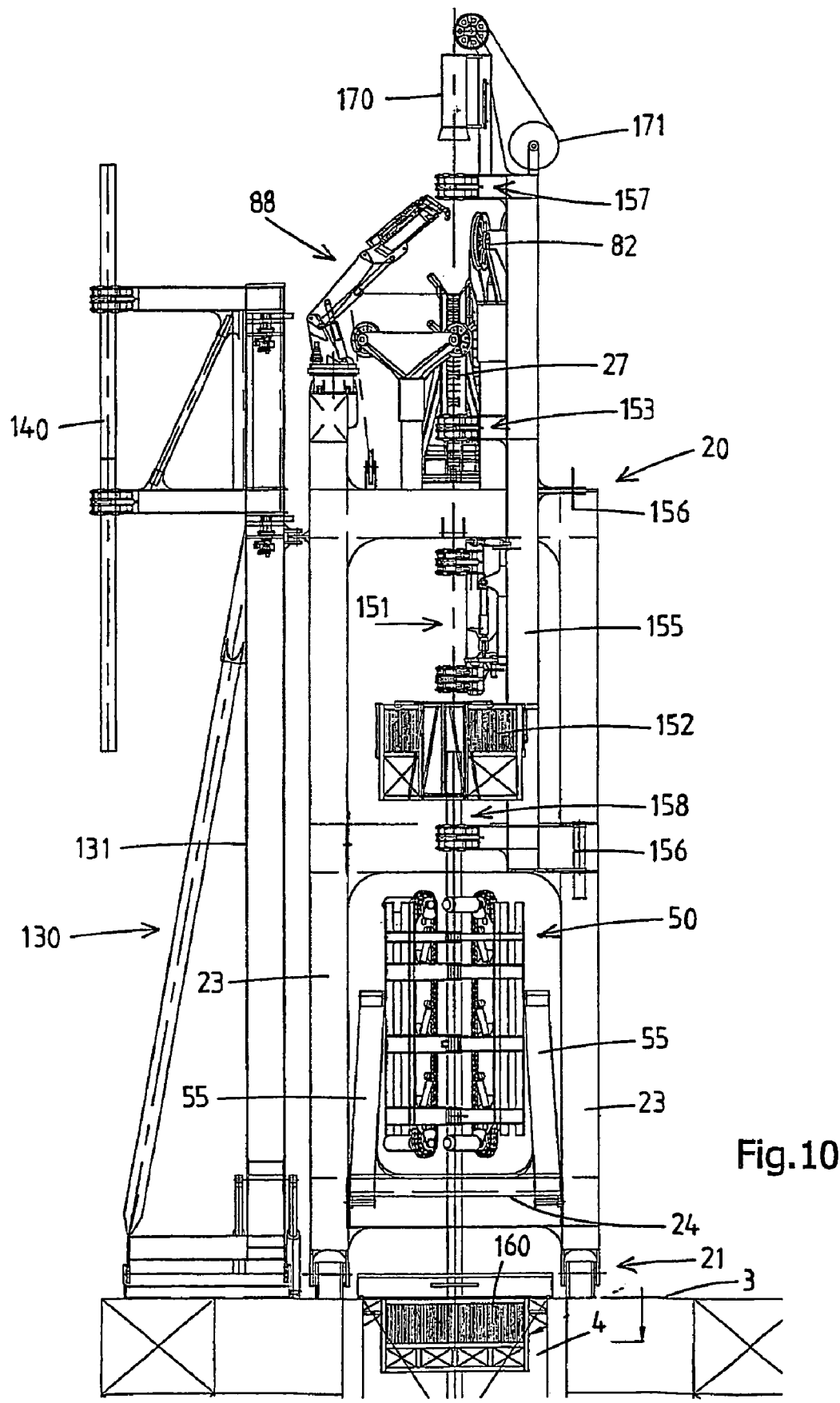
Figure 11:
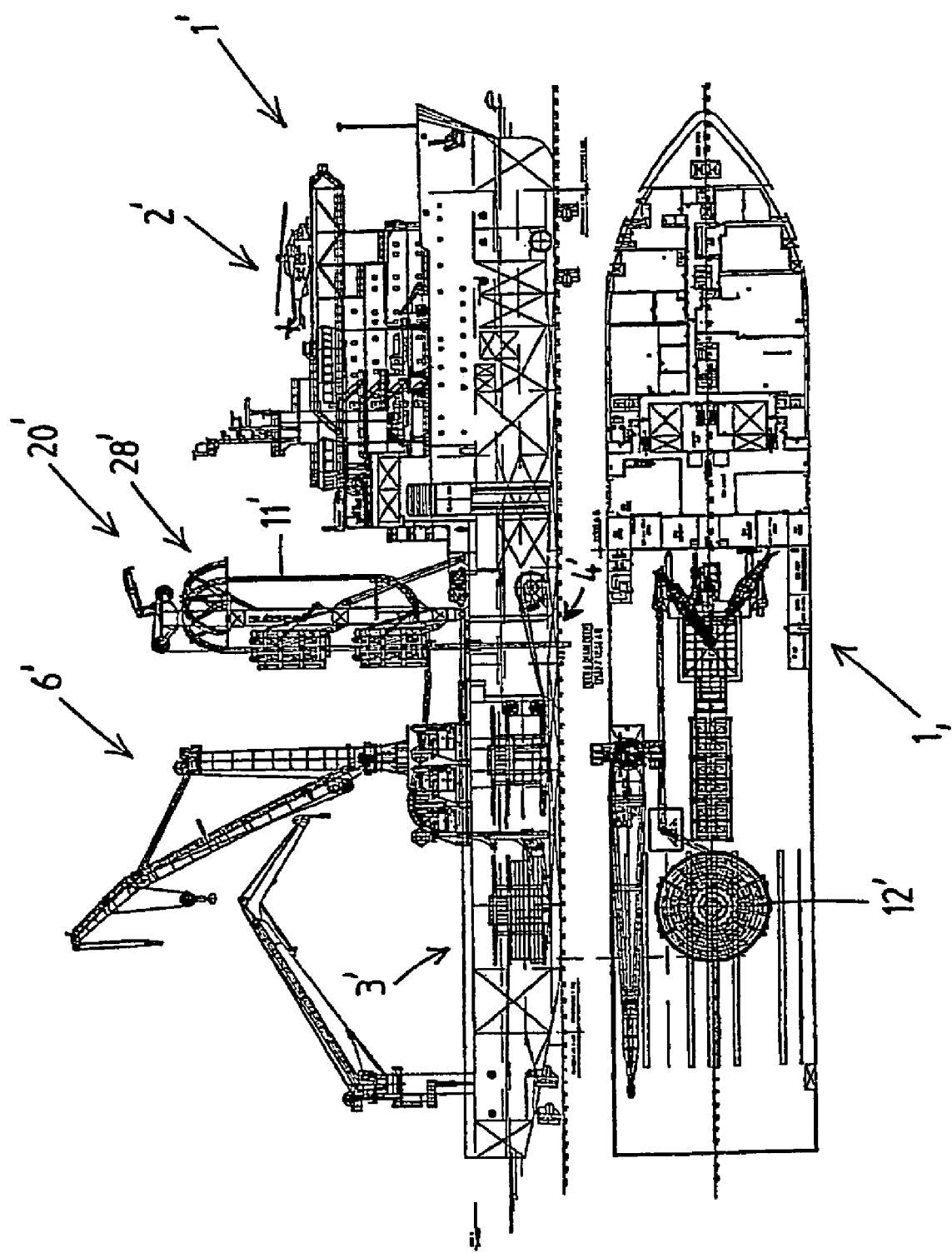
Figure 12:
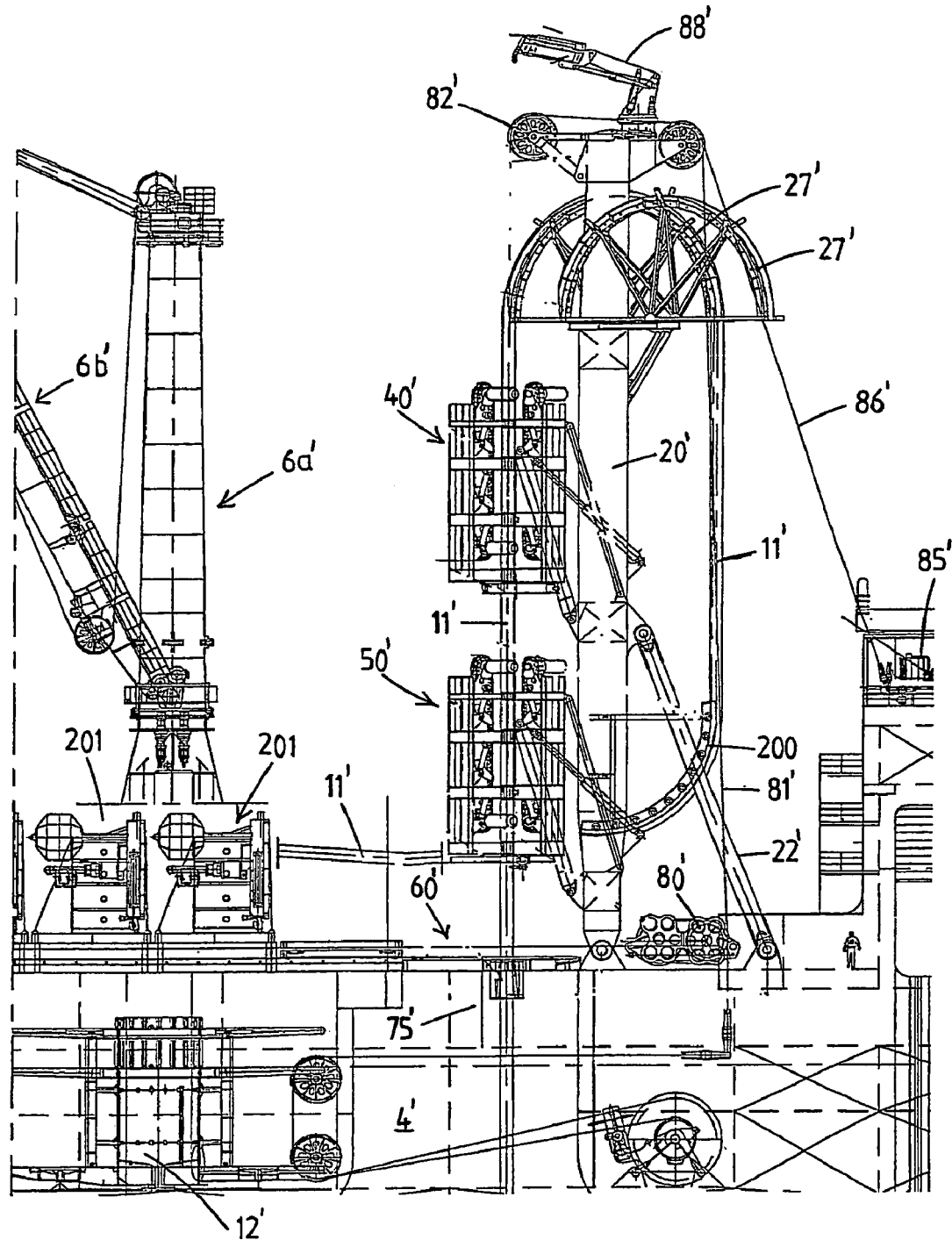
Figure 13:
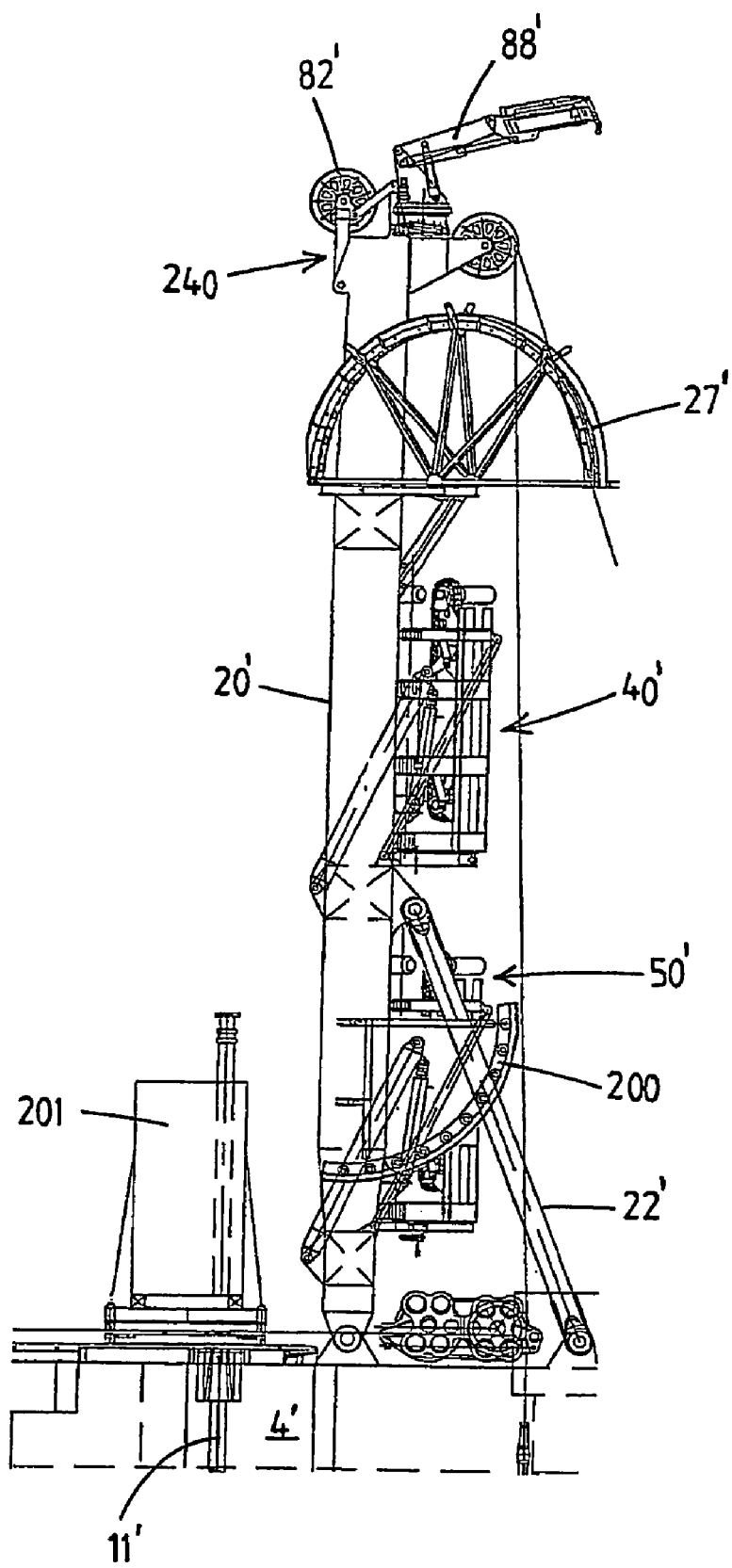
Figure 14:
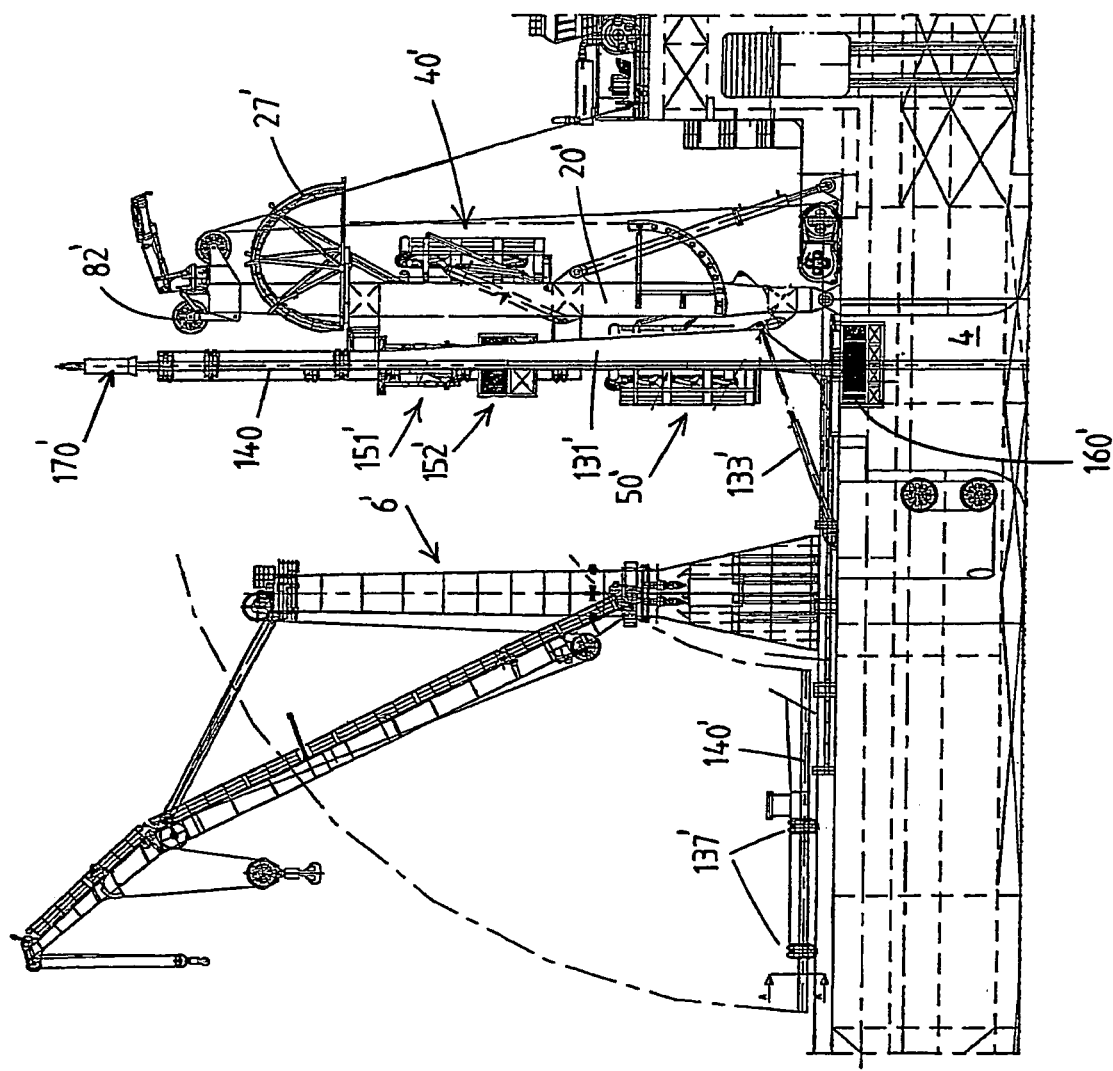
Figure 15:
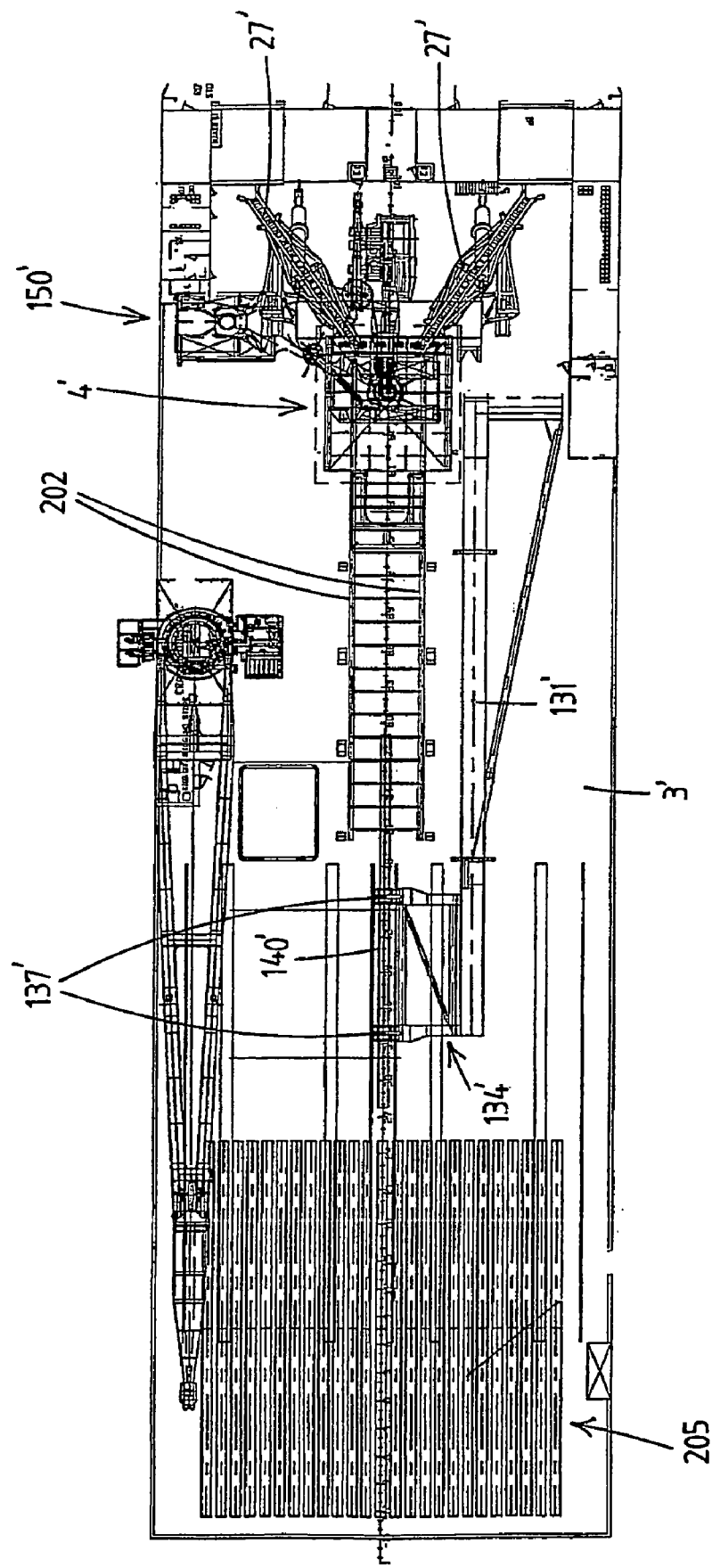
Figure 16:
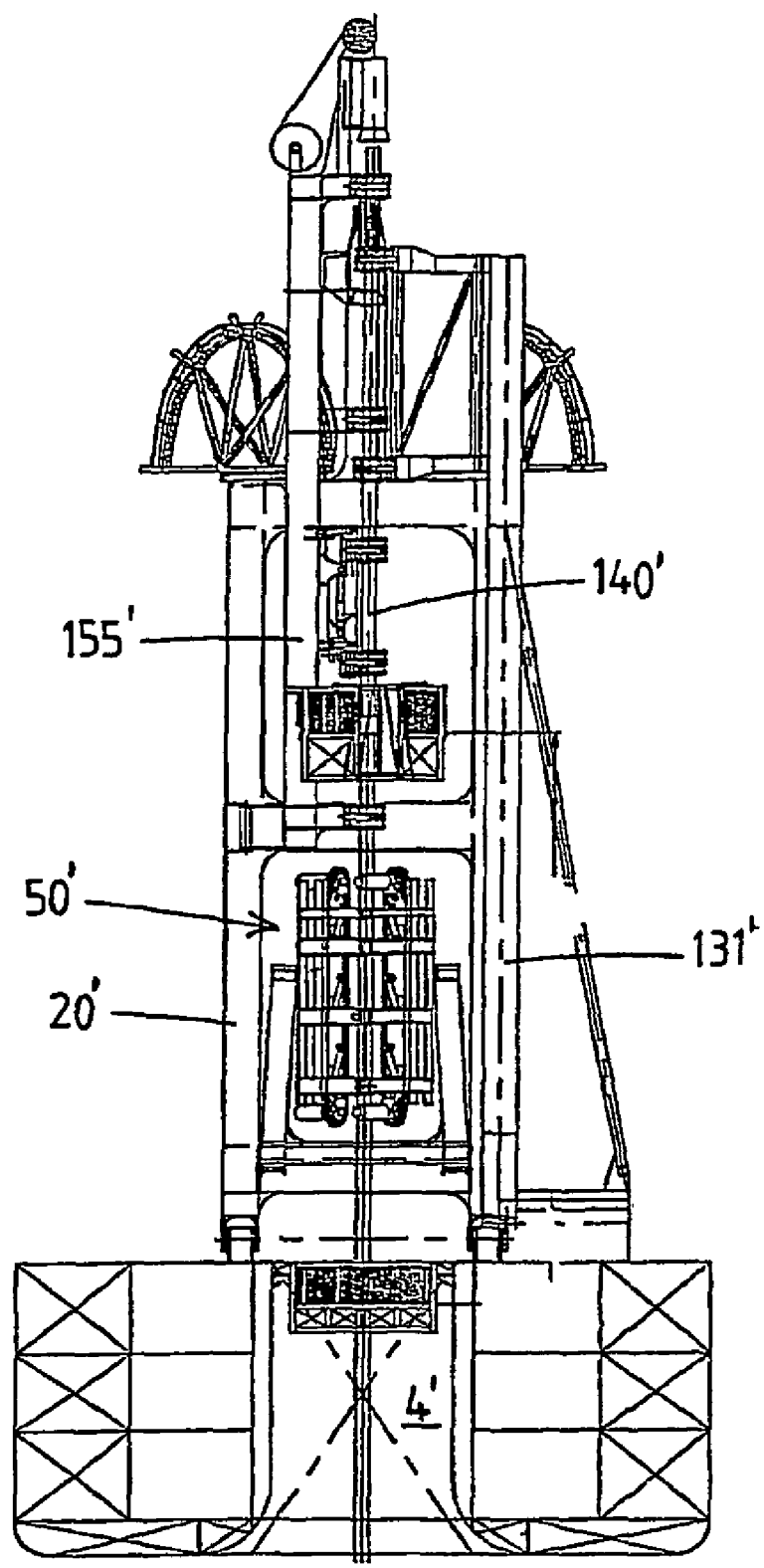
Figure 17:
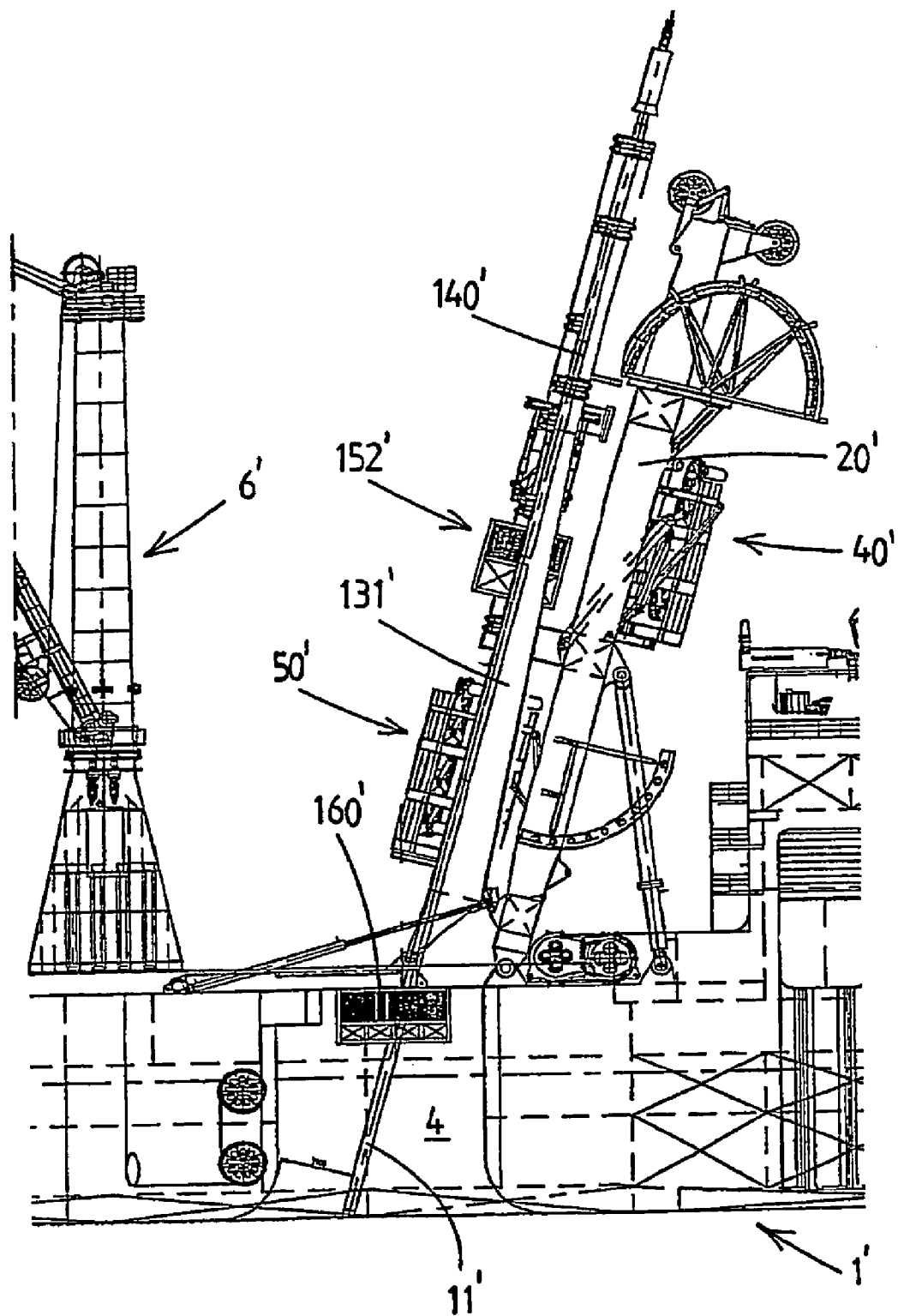
Figure 18:
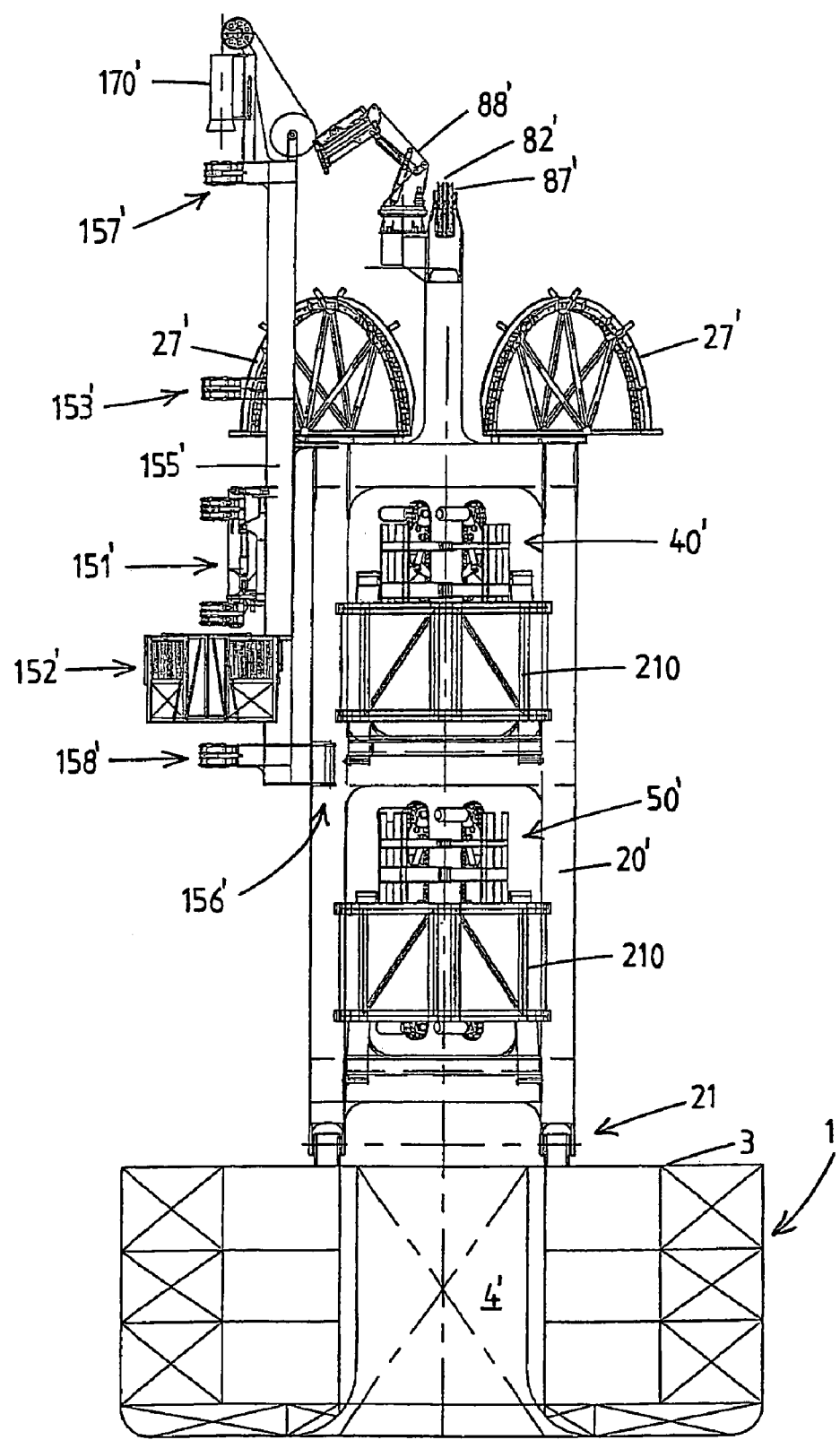
Figure 19:
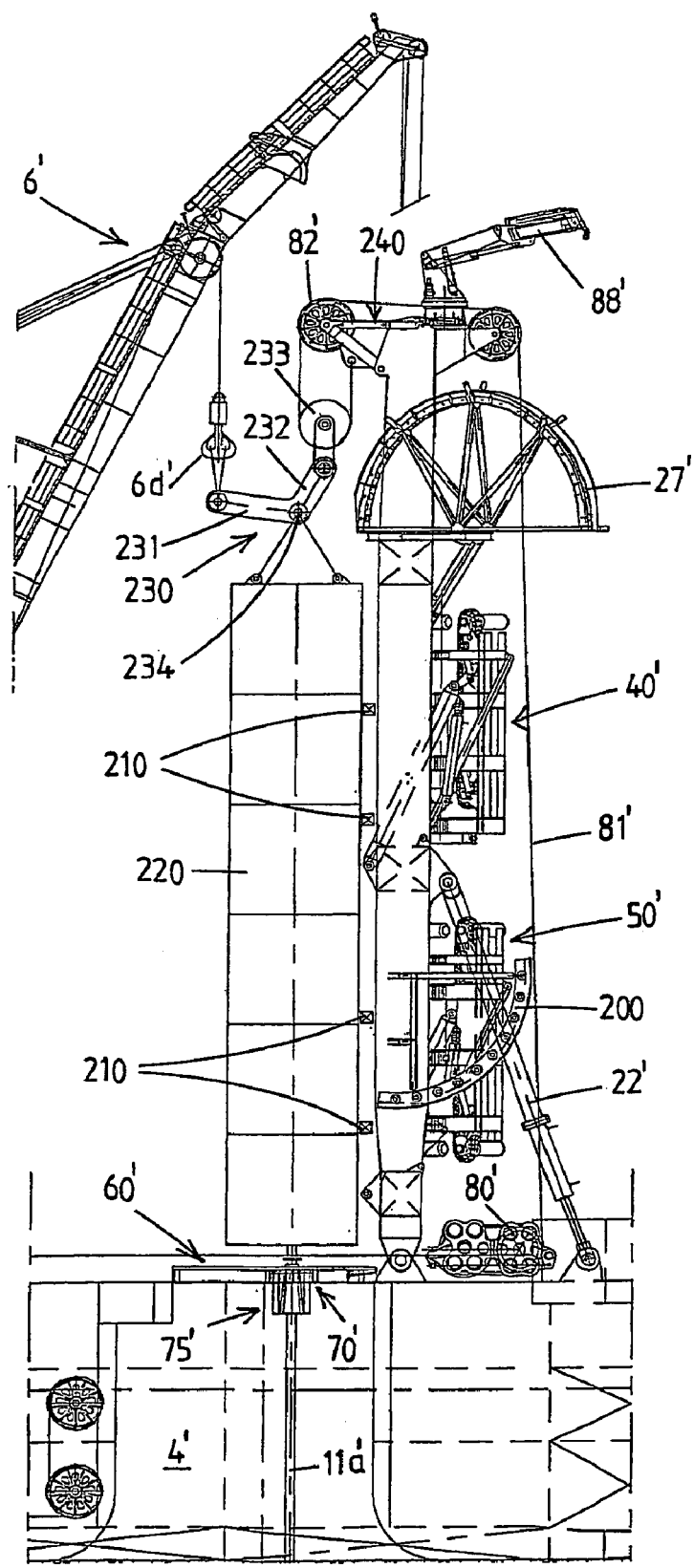
Figure 20:
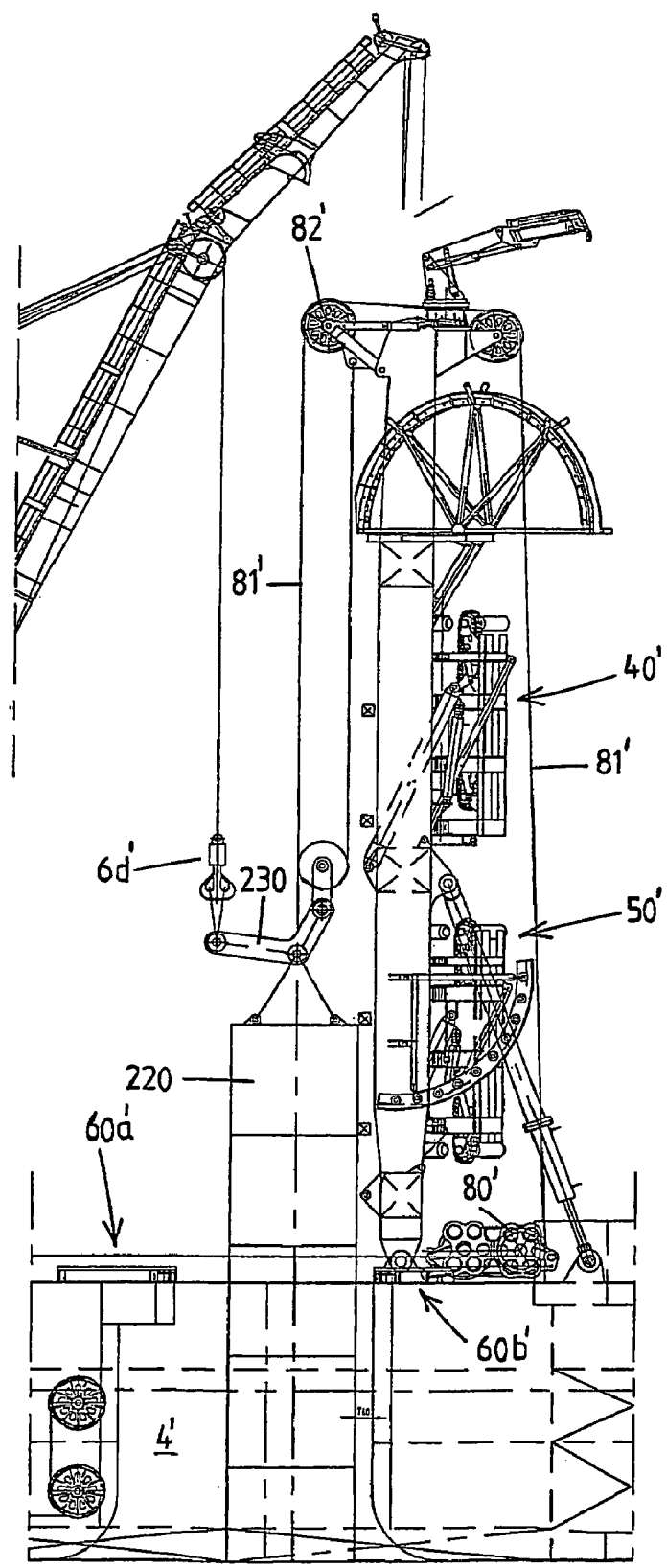
Figure 21:
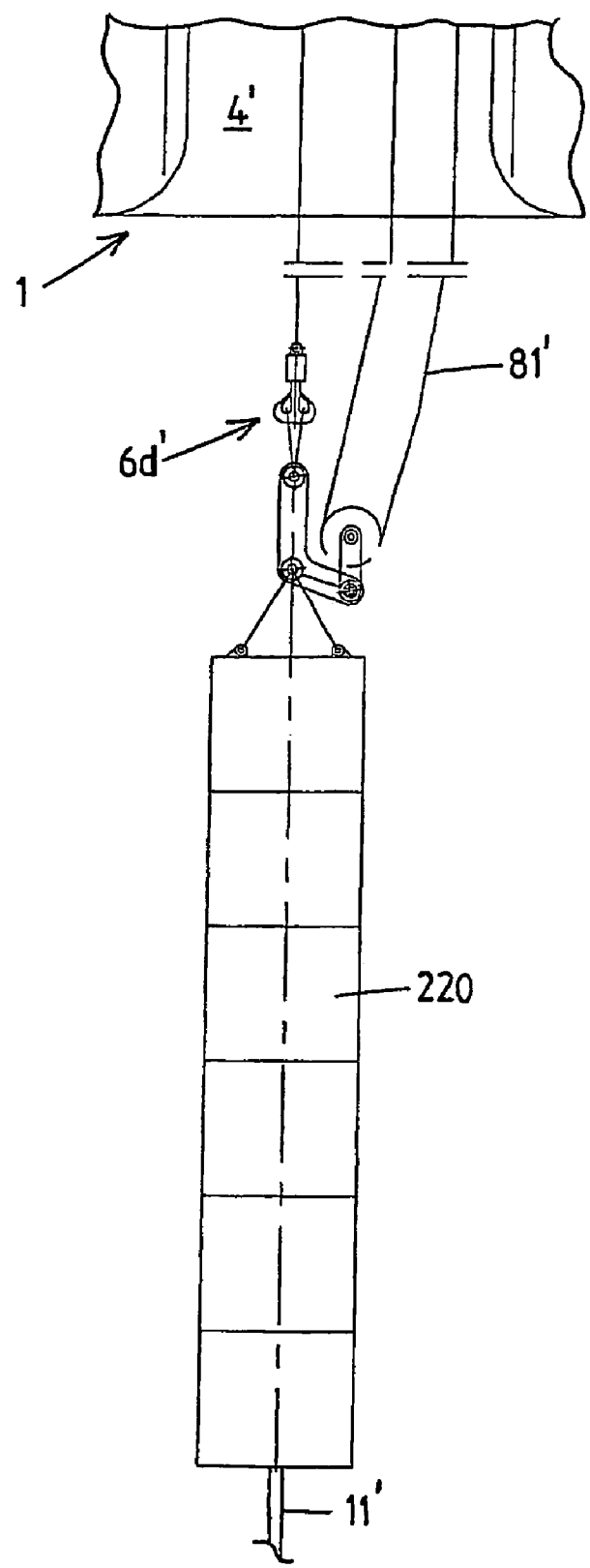
Figure 22:
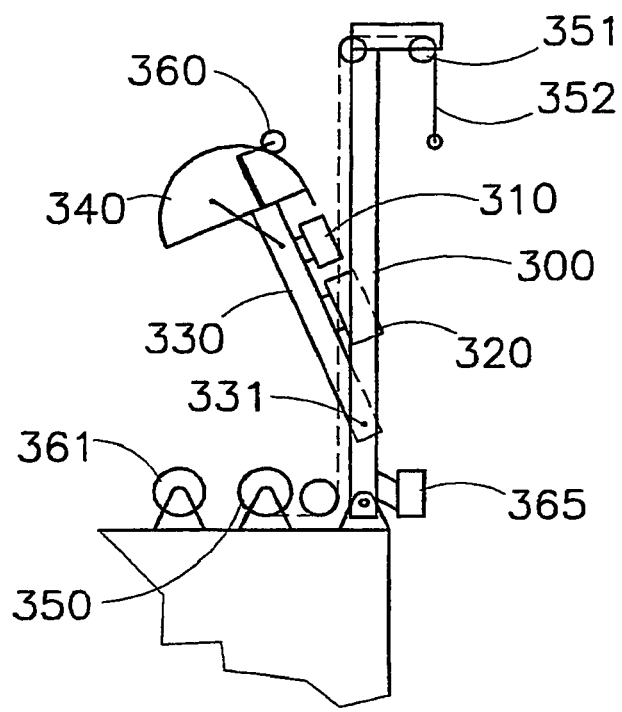
Figure 23:
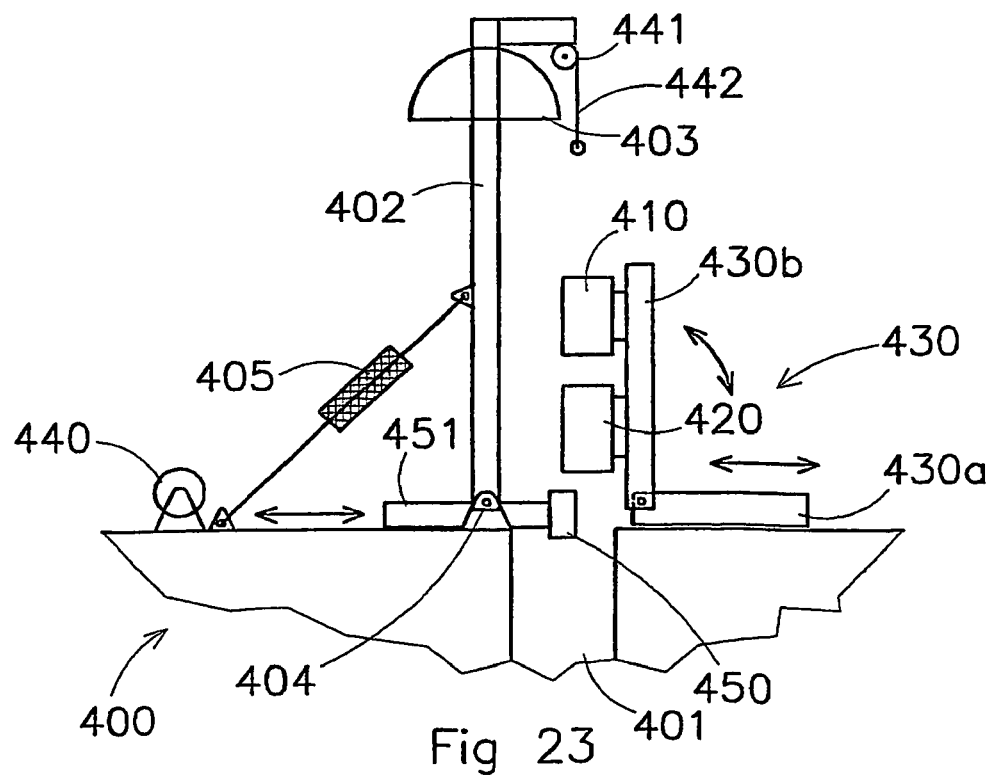

FIG. 4a, b show a vessel with the system of FIG. 1 in side view and plan view respectively;

FIG. 5 shows in side view the system of FIG. 1 here also including a J-Lay installation for laying single length pipe sections, FIG. 6 shows in front view the system of FIG. 5 during J-Lay;

FIG. 7 illustrates the tilting of the tower, here when the system of FIG. 5 is in use;

FIG. 8a,b show in side view and front view the system of FIG. 5 during Reel laying;

FIG. 9 shows in horizontal cross-section the system of FIG. 5 during J-laying with retracted upper tensioner;

FIG. 10 shows in front view an alternative for the system of FIG. 5 for J-Laying of double length pipe sections, FIG. 11a,b show a vessel equipped with a preferred embodiment of a marine pipelaying system according to the invention during Reel laying in side view and in plan view (both partly in cross-section);

FIG. 12 shows in side view a part of the vessel of FIG. 11 on an enlarged scale;

FIG. 13 shows in plan view a part of the vessel of FIG. 11 on an enlarged scale;

FIG. 14 shows the tower of the vessel of FIG. 12 with retracted tensioners;

FIG. 15 shows in side view a vessel equipped with an alternative of the system of FIG. 12 for J-laying double length pipe sections, FIG. 16 shows the vessel of FIG. 15 in aft view during J-lay, FIG. 17 shows the vessel of FIG. 15 with tilted tower during J-lay;

FIG. 18 shows the vessel of FIG. 15 in aft view with J-lay installation in retracted position and tensioners retracted;

FIG. 19 shows, in side view, placement of buoyancy element next to tower on top of previously launched pipeline;

FIG. 20 shows lowering of buoyancy element connected to pipeline;

FIG. 21 illustrates load transfer to crane during subsea installation of buoyancy element and interconnected pipeline;

FIG. 22 shows schematically an alternative embodiment of a pipe installation system according to the present invention;

FIG. 23 shows schematically a further alternative embodiment of a pipe installation system according to the present invention.

FIGS. 4a,b show an example of a marine pipelaying vessel 1 according to the present invention. The vessel 1 here is of a monohull design, but other design (e.g. as a semi-submersible vessel, as converted drilling rig, etc) are also possible.

The vessel 1 here has a forward placed upper structure 2, including crew quarters, bridge, helicopter deck, etc. Behind said forward upper structure 2 a working deck 3 extends to the stern of the vessel.

A moonpool 4 is provided in said deck 3, extending through the hull, here located on the centreline of the vessel 1 and about centrally in relation to the length of the vessel 1.

The vessel 1 is provided with several propulsion members 5 and suitable dynamic positioning equipment to allow dynamic positioning of the vessel 1.

Adjacent the moonpool 4, here at the stern side of said moonpool 4, the vessel 1 is equipped with a pipeline launch tower 20, which will be described in more detail below. The tower 20 allows to launch pipeline (and other objects as will be explained) through said moonpool 4.

The vessel 1 here further has a major crane 6 for handling objects. The crane 6 is dimensioned and stationed such that it allows to support the marine pipelaying operations carried out with the tower 20 when necessary. In this design the crane 6 has a working height reaching to above the tower 20 and a reach substantially all over said deck 3. The crane 6 here is mounted adjacent a side of the vessel 1.

A further crane 7 of lower height and capacity here is mounted adjacent the stern of the vessel 1.

As is illustrated in the FIGS. 4a, b the vessel 1 can be designed to have one or multiple storage reels 8 for pipeline 11 to be laid. As is common in the art the pipeline can be flexible pipeline (commonly a (steel) reinforced thermoplastic pipeline, mostly including a thick and multi-layered pipe wall) or a rigid pipeline (commonly a coated or non-coated steel pipeline). The pipeline spooled on a reel could eventually already include an integrated connector which connects two lengths of flexible pipeline together as in known in the art.

It is shown in this example that two sets of rails 9 are provided on the deck 3, essentially next to one another, so that each can receive on or more reels 8 having a horizontal reel axis (called vertical reels 8).

It is also shown here that the vessel 1 could have one or more reels 12 arranged (partly) within the hull of the vessel 1. Here two horizontal reels (having a vertical reel axis) are shown below deck 3.

It will be clear to the man skilled in the art that any other suitable location and embodiment of the reel(s) can be envisaged for the vessel of the invention.

The tower 20 will now be explained in more detail referring to FIGS. 1-3.

The tower 20 here is designed as a structure arranged at one side of the moonpool 4. In FIG. 1 the tower 20 is arranged at the aft side of the moonpool, the firing line or pipeline launch trajectory extending along the bow or front side of the tower 20.

In an alternative layout the tower 20 could e.g. be arranged at the port or starboard side of the vessel.

In another, non-preferred embodiment, the tower could have the form of a derrick (e.g. a latticed framework) extending over the moonpool 4, wherein the firing line or pipeline launch trajectory passes within the structure of the derrick.

The tower 20 is supported at its lower end on the hull of the vessel 1 by a pivot structure 21 having a horizontal pivot axis, here at right angles to the centreline of the vessel 1.

At least one, here two telescopic members 22 arranged between the vessel hull and the tower 20 allow to adjust the inclination of the tower 20. In this example the inclination of the tower 20 can be varied in the range from 0 degrees to 20 degrees from vertical. When desired a smaller or broader range of tower inclination (or even a non-inclinable tower) can be envisaged.

In this example the tower 20 comprises two spaced apart main vertical beams 23 interconnected by a number of horizontal crossbeams 24, 25, 26 (see also FIGS. 8a,b).

At or near the upper end of the tower 20 a pipeline guide is arranged, here embodied as a semi-circular pipeline guide member 27 having rollers 28 over which the pipeline to be laid can be guided. As such the guide member 27 diverts the pipeline 11 coming from a reel (here essentially in vertically upward direction) to an imaginary pipeline launch trajectory 30 here extending along the moonpool 4 facing side of the tower 20. The trajectory 30 here is essentially parallel to the tower 20 and the remains so even when the tower 20 is inclined.

As is clear from the drawings the system may include a number of additional pipeline guide members 17, 18, 19 to establish a path for the pipeline between the position of the reel and the guide member 27 in the tower.

In an embodiment of the tower as a derrick over said moonpool the trajectory would extend within said derrick.

The tower 20 is equipped in this example (as is preferred) with two pipeline tensioners, an upper tensioner 40 and a lower tensioner 50. This arrangement of two tensioners 40,50 allows for a large number of operations to be performed (more than with a single tensioner), whereas a larger number of tensioners (although possible with the present invention) is considered to increase the complexity of the system in undesirable manner.

Tensioners are well known in the art of marine pipelaying. Commonly such tensioners include a tensioner frame and multiple, e.g. four endless tracks supported in a mobile manner in the frame to allow for variation of the gap between the tensioner to at least accommodate various pipeline diameters. Basically any suitable tensioner can be employed in conjunction with the present inventive pipelaying system and method, as long as the frame is arranged to allow for retraction thereof with respted to the tower as will be explained herein.

As is also common in the art the tensioner tracks here each form part of a track unit including a robust chassis, support rollers or other bearing means mounted therein for the endless track (not shown), and one more track drive/brake members (e.g. a hydraulic motor) for effecting drive and/or braking motion of the track. Furthermore, as is a know option, the tensioner frames here are designed so that they can be opened, so that in the open state an opening is present in the side of the frame which e.g. allows to bring a pipeline sideways into the tensioner and/or remove a pipeline from said tensioner.

Tensioners 40 and 50 are of a similar design here. In the example shown here each tensioner includes a tensioner frame and multiple, here four, tracks supported by said tensioner frame.

The tensioner frame in the design shown here is of the annular frame type, here generally comprising multiple ring frame members spaced along the axis of the tensioner and interconnected by further (generally axially extending) frame members.

In the design shown here, the tensioner frame is designed so that the tensioner can be opened. In this design the frame includes a base part, here essentially U-shaped in cross-section, onto which here two track units have been mounted, and two pivotable frame parts. Each of those parts is rotatable about a series of aligned hinges arranged in the ring frame members. The free ends of the pivotable frame parts are interconnectable/detachable via connecting members, e.g. pins which can be fitted through aligned openings in the free ends.

In this design each pivotable frame part can be pivoted such that the pivotable frame parts are displaced fully from their active position so as to create an open space or clear envelope "in front of" the base part of the frame. As is preferred the frame parts can pivot over more than 90 degrees outward.

As mentioned before each tensioner 40, 50 can have a high capacity for supporting pipeline load, preferably of at least 100 tonnes. In this example it is envisaged that each tensioner 40, 50 has a capacity of about 400 tons.

The frame of each tensioner 40, 50 is supported by the tower 20 via an associated support assembly.

In this preferred embodiment the tensioners 40, 50 are each supported by a parallel bar linkage composed here of two sets of parallel support bars 45, 55, each set at one side of the frame. As is common the bars 45, 55 are pivoted at both their ends to the tower 20 and the frame respectively.

As can be seen in the drawings the lower ends of the bars 45, 55 are connected here to the cross-members 24, 25 of the tower 20.

At each parallel bar assembly an actuator, here a hydraulic cylinder 46, 56 is provided, to effect motion of the linkage and thus of the tensioner frame supported thereby.

Figure 3:
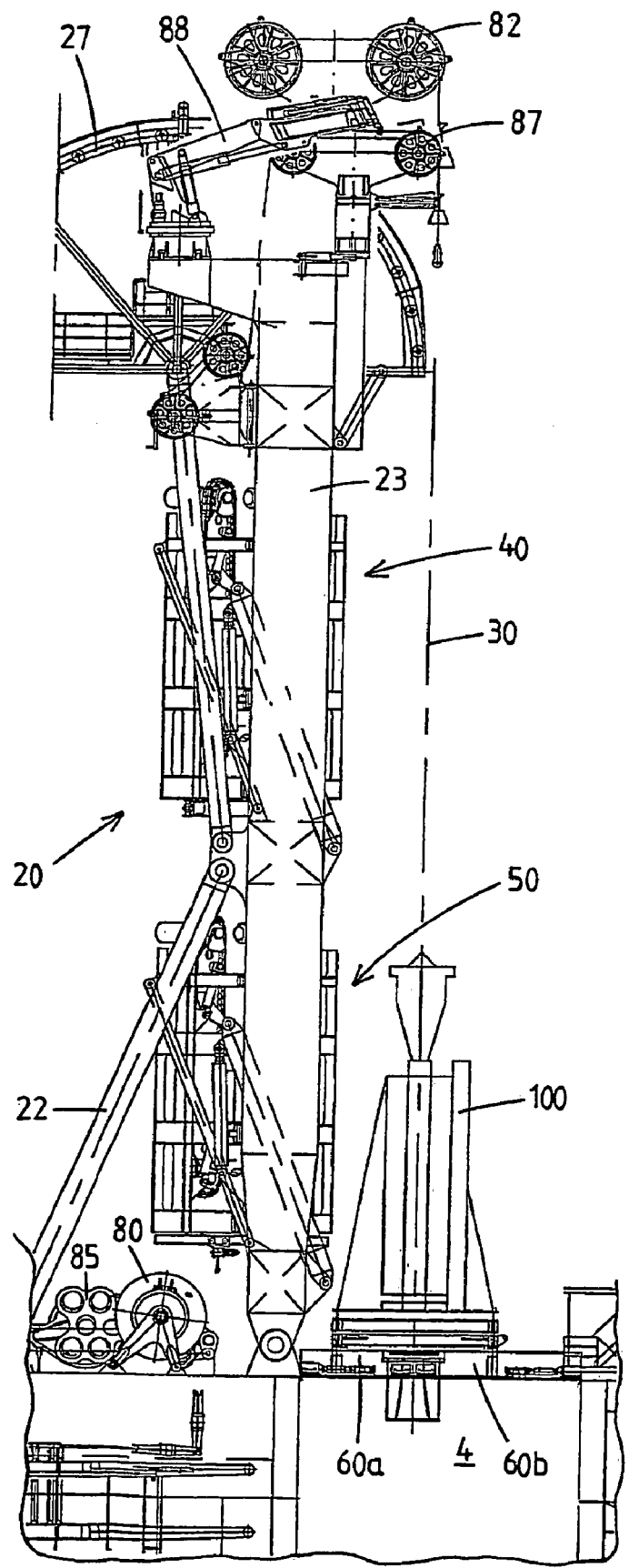
FIG. 3 shows the system of FIG. 1 with retracted tensioners.

As can be easily seen from both FIGS. 1 and 3 each tensioner frame (and the track units arranged therein) can be displaced between an active position (FIG. 1), wherein the pipeline launch trajectory 30 extends through the tensioner frame between the tracks, so that the tracks can engage on a pipeline, and a retracted and non-operable position (FIG. 3), wherein the pipeline launch trajectory 30 extends outside the frame of the tensioner.

In the retracted position in this example each of the tensioners 40, 50 is received between the opening in the tower 20 formed by the vertical beams and the horizontal beams above and below the retracted tensioner. This provides for a docking station of each tensioner in retracted position. The tower 20 preferably is provided with one or more platforms to gain access to the tensioners in their retracted and possibly active position by crew of the vessel.

As is preferred, in this example a tensioner frame in its retracted position is spaced more than 1 meter, more preferably more than 2 meters from the launch trajectory 30. This creates a large "space" at the location where the tensioner used to be in its active position. This "space" can be used very advantageously for several purposes as will be apparent from the following part of the description.

It will be apparent to the man skilled in the art that other support assemblies are possible for the tensioner frames. For instance a translatory support assembly is provided for the tensioner frame, e.g. including telescopic support arms or the like. Also a tilting or hinged support assembly could be provided, e.g. allowing the tilting or pivoting of the frame about a vertical or horizontal axis between an active and retracted position with respect to the tower.

In particular for laying "rigid pipe" stored on a reel the system could include a straightener assembly mounted at an elevated position on the tower, preferably between the guide member 27 and the upper tensioner 40 as is known in the art.

Figure 2:
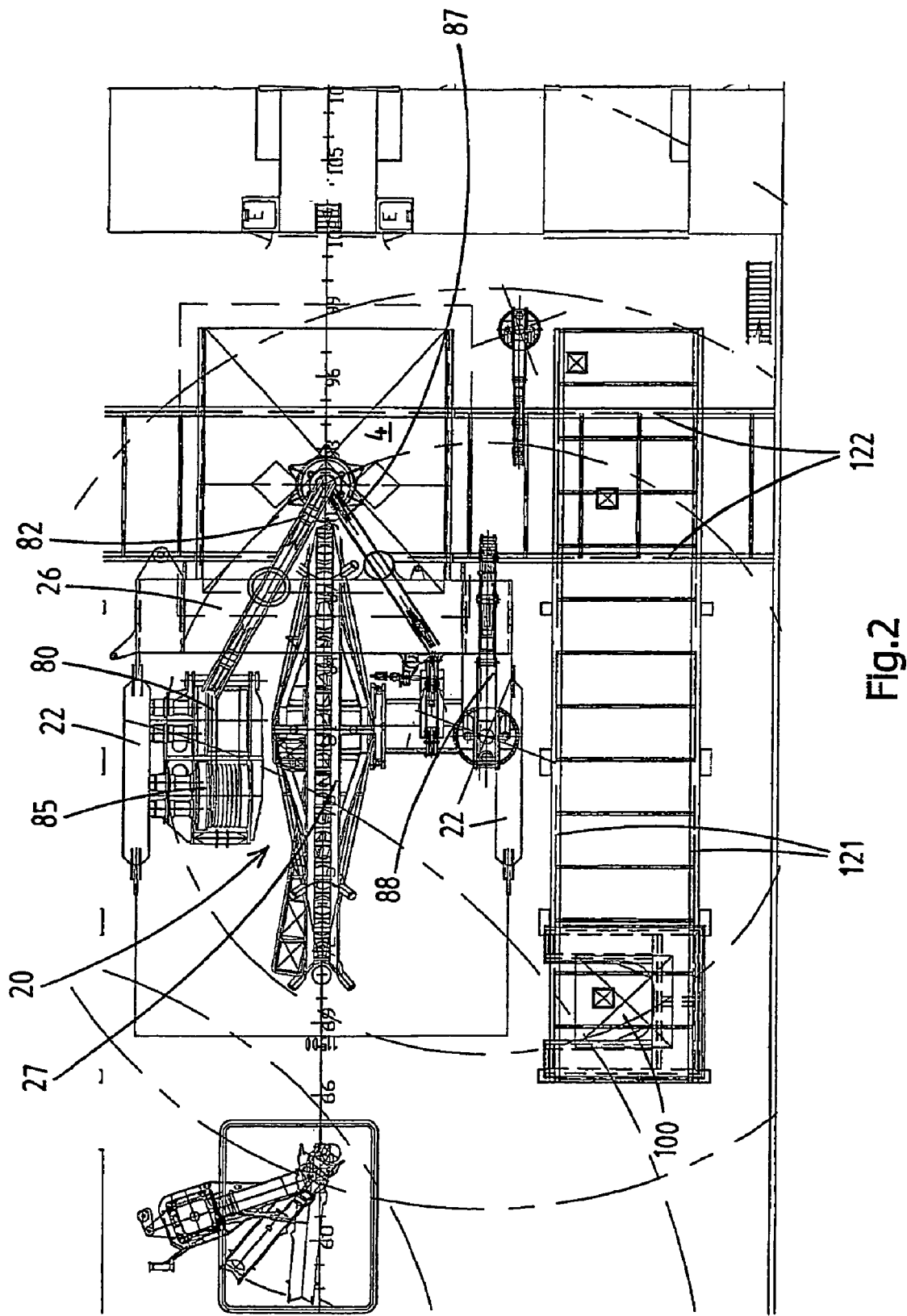
FIG. 2 shows the system of FIG. 1 in plan view.

Now further describing the embodiment of FIGS. 1-3 reference is made to the moonpool 4.

In this example the moonpool 4 can be covered by a hatch assembly 60 with one or more movable hatch panels 60$a,b$ adapted to cover said moonpool 4 at the level of the deck 3.

For instance the hatch panels 60$a,b$ are slideable using associated hydraulic cylinders.

The pipelaying system here further includes in addition to the two tensioners in the tower 20 a stationary or static pipeline support device 70, arranged below the tensioners 40, 50 and adapted to support—on its own—the entire weight of the launched pipeline suspending towards the seabed.

Said pipeline support device 70 can be a stationary frictional clamp, having one or more clamping elements engaging on the pipeline, said clamping elements being stationary while supporting the pipeline and not being part of a track (as in a tensioner) so that the pipeline can not be moved using said stationary frictional clamp in the direction of the pipeline axis.

It could be that the stationary pipeline support device 70 does allow for displacement essentially in a plane at right angles to the supported pipeline, possibly while supporting the load of the pipeline. In this respect "stationary" essentially means "stationary in the direction of the pipeline".

In this example the support device 70 is embodied as a stationary hang-off clamp 70 which can engage on the pipeline, e.g. having one or more support element engaging below a collar on the pipeline, and support the pipeline in a stationary manner. These hang-off clamps commonly include multiple mobile clamp parts allowing the clamp to be opened for release and passage of the pipeline and closed for support of the pipeline.

Preferably said a stationary or static pipeline support device 70, arranged below the tensioners 40, 50 is not supported by the tower 20, but on the hull of the vessel, e.g. via a hatch over the moonpool or otherwise, e.g. a sliding static pipeline support device mounted on the hull of the vessel (preferably at level of the deck 3). It is noted that the support device 70 could be supported by the tower if desired.

In this example said pipeline support device 70 is integrated in the hatch assembly 60 or supported thereby, and the one or more hatch panels are adapted to support the weight of the launched pipeline when held by the device 70. In this example the hang-off clamp 70 is composed of two mating clamp parts, each integrated in a panel 60$a,b$ so that the pipeline can be held between in the clamp (e.g. a pipeline collar resting on said clamp parts) when the panels are in their closed position.

The hatch 60 here also includes a pipeline funnel 75 through which a pipeline may pass when laying pipeline with the hatch panels in closed position.

As is common for marine pipelaying vessels the vessel 1 includes an A&R system for abandonment and retrieval of pipeline. The A&R system here includes a main A&R winch 80 for a main A&R wire 81. This wire 81 is guided over a number of sheave including A&R sheave 82 arranged so that the A&R wire end is aligned with the trajectory 30 at the upper end of the tower 20. The A&R wire can thus extend along said pipeline launch trajectory 30 downwards.

Preferably, as is this embodiment, the sheave 82 is arranged significantly above, preferably at least 4 meters, the upper tensioner 40. It is an option to provide said sheave above the lower tensioner, beneath the upper tensioner. This would have the drawback of reduction of the height of accessories to be handled by the system when the A&R system is used therefor.

The A&R system here also includes a secondary A&R winch 85 with A&R wire 86 and associated sheaves, including sheave 87. The secondary system is designed for a lower SWL but at higher speed than the primary A&R system.

The tower 20 here also is provided with a knuckle-boom crane 88 at the upper end of the tower 20.

The vessel 1 further includes an accessory transport installation adapted for bringing an accessory, here a PLET 100 as example, to a location aligned with the pipeline launch trajectory 30 and/or aligned with a launched pipeline held by the pipeline support device 70, so that said accessory 100 may be connected to said (launched) pipeline.

The accessory transport installation 120 includes a rail structure (see plan view of FIG. 2) extending over the deck 3 of the vessel. In this example a first stretch of rails 121 is parallel to a side of the vessel and a second stretch 122 is at right angles thereto and extends "across" the moonpool 4.

The hatch panels 60$a,b$ include a section of said rail structure 122 so that an accessory can be placed on said hatch assembly when in closed position (and possibly holding the upper end of the launched pipeline).

A part of the rails 121 adjacent the hatch 60 is preferably fitted in a releaseble manner on the deck 3, so that this part can be removed when the hatch 60 has to be opened. The crane 6 can be used to remove and place these removable rail parts.

As to the design shown in FIGS. 1-3 it is noted that it is considered advantageous to arrange the tensioners 40,50 "relatively low" with respect to the deck of the vessel 1, for instance because of vessel stability and because of limitations placed on tower height. In the inventive system the height between the upper end of the moonpool 4 or the deck 3 and the lower tensioner 40 is preferably at most 5 meters. As will be explained below such a "limited height" forms no operational limitation when the lower tensioner is designed to be retractable.

It is noted that it is preferred to arrange all tensioners above the level of the deck 3 of the vessel, so as to protect the tensioners from the sea and to allow easy access to the tensioner. It can be envisaged that the lowermost tensioner is arranged above the waterline, in the range between the waterline and the deck 3.

FIG. 3 already reveals to the man skilled in the art a method in which the "retractability" of the tensioners 40, 50 can be used advantageously.

In FIG. 3 it is suggested that a PLET 100 of substantial height and diameter has to be fitted on the end of a new pipeline to be laid from the vessel. In order to do so the accessory transfer system of the vessel 1 allows to place the PLET 100 on the hatch panels 60*a,b* over the moonpool 4.

FIG. 3 shows that space for the PLET above the moonpool 4 is created by retracting the lower tensioner 50. The upper tensioner 50 can be brought to its active position and a pipeline can be introduced into said tensioner. The end of the pipeline could then be connected to the upper end of the PLET 100.

The tensioner 40 will have sufficient capacity to relief the weight of the PLET 100 from the hatch panels 60*a,b*, so that the hatch can be opened and the PLET 100 with attached pipeline submerged.

As mentioned before the tensioner may be of the type that can be opened, so that later the lower tensioner 50 can be brought into its active position and aid in supporting the pipeline weight.

The retractability of the tensioners 40, 50 can also be used to achieve the handling of a pipeline with an integrated large object, such as a connector in a flexible pipeline.

As mentioned before such connectors are very large (length of e.g. 10 meters and diameter of e.g. more than 1 meter). For passing such a connector over the top of the tower 20 one or more cranes of the vessel 1 can be used.

The lower tensioner 50 can then be used in its active position to hold the launched pipeline, whereas the upper tensioner 40 has already been moved to its retracted position. The connector can then be positioned above the lower tensioner. The pipeline and connector can then be suspended from A&R wire 81 and winch 80. This allows to relieve the pipeline weight from the lower tensioner 50 and to retract this tensioner 50. With the hatch 60 open the A&R system can then be used to lower the pipeline until the connector is within the moonpool 4. The hatch 60 and support device 70 can then be used to support the weight of the connector and pipeline, so that the A&R wire can be removed. Then the tensioners 40, 50 can be returned to their active position and engage on the pipeline. By relieving the weight of the pipeline and connector from the hatch, the hatch 60 can be opened and the pipelaying can continue.

In another embodiment of the tower a greater vertical gap between the lower and upper tensioner can be provided for. This e.g. allows for introduction of an accessory into a reel layed pipeline in the following manner. During reel laying, using both tensioners, the reel laying is interrupted and the pipeline severed between the tensioners. The lower tensioner then holds the launched pipeline, whereas the upper tensioner also remains in its active position and holds the end of the pipeline coming from the reel. Then an accessory is introduced into the space between both tensioners and connected to the launched pipeline and when also to the end of the pipeline coming from the reel. Then the weight of the launched pipeline is taken over by the upper tensioner. The lower tensioner can now be opened so as to retract the tensioner and allow for the passage of the accessory.

Referring now to FIGS. 5-9 now a version of the pipelaying system with one or more retractable tensioners will be described which not only allows for reel laying as previously described, but also allows for J-Laying of an offshore pipeline.

The system shown here is based on the system described with reference to FIGS. 1-4 and the same reference numerals will be used to indicate the same or similar parts of the system.

For J-laying of pipeline it is in this example envisaged that the upper tensioner 40 (not shown in FIG. 6) is brought in its retracted position, while the lower tensioner 50 is in its active position.

The "space" thus created next to the tower at the height of the upper tensioner 40 is now used to arrange equipment and work space for J-laying.

FIG. 6 shows that adjacent the tower 20 a pipe loader 130 has been placed (on the deck 3), here mainly composed of a boom structure 131 which can be pivoted about pivot structure 132 between a horizontal loading position and a vertical unloading or transfer position. One or more (hydraulic) actuators 133 have been arranged for tilting the boom structure 130.

It is preferred to have the pivot structure 132 arranged such that the pivot axis coincides with the pivot axis of the tower.

The boom structure 131 is provided with a gripper assembly 134 for gripping a double length pipe section 140, i.e. two normal 40 foot (12 meters) lengths of pipe welded together (either on the vessel or earlier). The gripper assembly 134 here includes a rotatable gripper arm structure 135 which can pivot about a pivot axis 136 parallel to the boom structure 131, e.g. by suitable hydraulic actuator. At the end of the gripper arm structure 134 here two pipe grippers 137 have been arranged which can grip the section 140.

A latch assembly 138 is provided to latch the raised boom structure 131 with respect to the tower 20 when desired. This allows to store the boom structure 131 in raised position when not in use, which increases clear deck space.

For "loading" the section 140 for J-lay it is envisaged that the section 140, which is on the deck 3 (e.g. in a suitable rack) is gripped with the boom structure 140 horizontal. Then the boom structure 130 is raised to vertical with the gripper arm structure 135 directed outwards. Then the structure 135 is rotated, so that the section 140 is brought inline with the trajectory 30.

The pipe loader 130 can have another design as long as it is able to sequentially supply (single or double lengths or otherwise) pipe sections to an elevated position aligned with the pipeline launch trajectory 30 in the tower. In a less favoured embodiment a crane on the vessel, e.g. crane 6, can be employed as pipe loader for J-Lay operations.

At the height of the upper tensioner 40 here the tower 20 also is provided with J-lay equipment 150 which is displaceable between an active and retracted position.

Figure 8B:
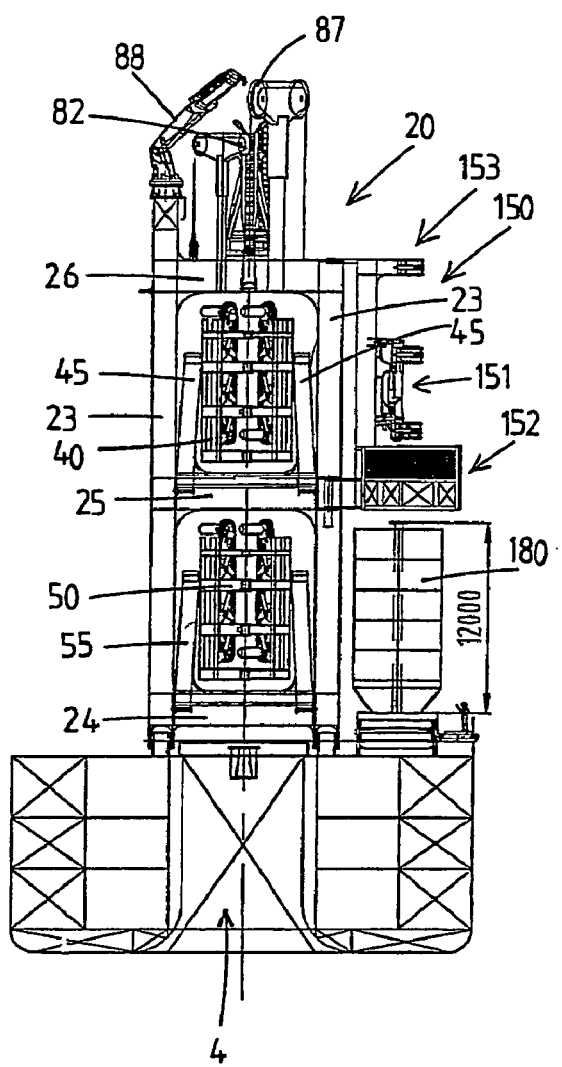

In the retracted position this J-Lay equipment 150 here is arranged on a lateral side of the tower as can be seen in FIGS. 8b and 9 (right hand side position).

In the active position the J-Lay equipment 150 is arranged so as to allow operation(s) with regard to pipeline arranged in the trajectory 30.

The J-Lay equipment 150 here includes an external pipe section alignment device 151, which may include one or more pipe clamps as well as associated actuators for effecting alignment movements of these clamps in order to accurately align the lower end of the new pipe section 140 with the upper end of the pipeline held by the lower tensioner 50.

In this example the equipment 150 further includes a pipe section work station, e.g. a welding station 152, here including a welding chamber with floor having a closeable side entrance 153 for the pipe section 140. Welding equipment can be arranged in said welding station to weld the pipeline ends together.

Above the external pipe section alignment device 151 here a roller assembly 153 is provided for laterally supporting the pipe section 140.

In this example J-lay equipment 150, here the device 151 and work station 152 and roller assembly 153, is mounted on a support structure 155, which here is mounted pivotally on the tower 20 about a pivot axis 156 extending parallel to the length of the tower.

A second work station 160, e.g. for coating the pipeline, e.g. in the area of a weld or other connection, is proposed, here on the moonpool hatch 60 below the lower tensioner 50. The station 160 could also be mounted (in a dismountable manner when desired) on the tower 20 at said location.

The system could be provided with non-destructive testing or NDT equipment at one or more of the mentioned stations or at a separate station.

When performing J-Lay operation it is sometimes desired to arrange the tower 20 at an incline as is known from the art. FIG. 7 shows that such tilting is possible with all J-Lay equipment 150 on said tower 20 (and the loader 130) still being functional.

The system shown here also includes an internal clamp (not shown), possibly an internal alignment clamp, for engaging internally on the ends to be connected on the inside of the pipeline. The tower 20 is provided with an internal clamp station 170 above the location of the upper end of the new pipe section 140 and with an associated winch 171 for lowering and raising said internal clamp inside the pipe section 140.

It will be clear that when performing J-lay a new pipe section 140 will be brought above the upper end of the launched pipeline held by the lower tensioner 50 and aligned with said upper end. Then welding (or otherwise) will be performed. The lower tensioner 50 will then effect a controlled lowering of the pipeline.

Depending on the height difference between the stations 152 and 160 it will be possible to achieve that the newly made weld finds itself in station 160 (e.g. for coating) whereas a new weld or other type of connection can simultaneously be made at station 152. This is possible when this height difference equals the length of the new section 140. When the difference is smaller the lowering may be effected such that the weld is brought in station 160 and then is inspected. Thereafter the pipeline can be lowered some more so that a new pipe section can be welded to the upper end.

So the FIGS. 5-9 show that with some additional equipment, possible pre-arranged on the tower or only fitted when use is envisaged (e.g. stored on deck and raised using a crane of the vessel), a versatile system is created allowing both reel laying and J-lay.

It is noted that in an alternative design the lower tensioner is retracted for performing J-lay and the J-lay equipment is arranged to be active at the height of said lower tensioner. This is e.g. possible when using clamp device 70 during J-lay, so that the launched pipeline is held by said device 70 and a new pipe section (e.g. a single 12 meter length section) is brought above said clamp device 70 and welded onto the launched pipeline. An A&R system of the vessel could then be used to lower the pipeline in order to add a new section.

It can also be envisaged that during the above approach also the upper tensioner is retracted so that the complete height of the tower is available for J-lay. This allows each to add even longer new pipe sections (e.g. triple lengths) to the launched pipeline held by the clamp device 70.

A particular operation which can be performed using the versatile system of FIGS. 5-9 with retractable tensioners will now be described.

It has been proposed to install risers of the type wherein an essentially vertical riser part extends upward from the seabed to a submerged buoy, and a further catenary riser part extends from said buoy to a vessel, e.g. a rig, FPSO, tanker loading point, etc.

In a particular embodiment an array of such risers is propose spaced around the vessel, the vertical riser parts extending offset from the vessel.

Such a type of riser can now be installed starting with the upper tensioner 40 retracted and the J-lay equipment 150 in its active position. In this arrangement the vertical riser part can be created from the vessel 1 using the J-Lay technique. The upper end of the vertical riser part can then be lowered (using an A&R wire or lower tensioner) so that then the launched vertical riser part becomes suspended by the pipeline support device 70, here in the hatch 60.

The lower tensioner 50 is in this example retracted to create a working space above the moonpool 4 now closed by the hatch 60. Then the large buoy (shown in FIG. 8b as item 180) can be brought above the moonpool hatch (e.g. using the rail structure as described) and then this buoy can be fitted to the upper end of the launched vertical riser part.

In addition the J-Lay equipment 150 is now moved to its retracted position, so that now the upper tensioner 40 can be brought to its active position. A pipeline coming from a reel on the vessel 1 can now be brought over the guide 27 and into the tensioner 40. This pipeline can then be connected to the top of the buoy 180.

Using the upper tensioner 40 now the weight can be lifted from the hatch and the hatch 60 can be opened. Then the pipeline can be lowered along with the buoy 180 through the moonpool 4 and reel laying of pipeline can continue to create the catenary riser part. If needed the lower tensioner 50 can be returned to its active position to assist in the pipelaying.

It can also be envisaged that the flexible riser part has to be connected to the lower end of the buoy. For this type it is proposed to use the A&R system to lower the vertical riser part with fitted buoy into the sea, preferably to below the vessel.

In addition the crane 6 will be connected to the buoy 180 and suspended riser part.

As the buoy is submerged it will be possible to transfer the weight of to the crane 6 and disconnect the A&R wire from the buoy 180. It is noted that the buoyancy of the buoy 180, which can be controlled e.g. if the buoy includes one or more air tanks that can be ballasted/emptied, will then absorb most of the weight.

Then the tower 20 is brought into the reel laying mode and a flexible riser part is reel-layed from the vessel through the moonpool. A tie-in wire or other technique can then be used to connect the flexible riser part to a connector mounted at the lower end of the buoy or within the vertical riser part below the buoy 180.

It is preferred to provide the crane 6 assisting with the pipeline installation (or riser installation) with an active heave compensation system as is known in the art. Using this heave compensation system the vertical riser part can be landed onto the seabed, in particular onto any suitable subsea equipment installed on the seabed.

It is also an option, and even preferred, to provide an A&R system of the vessel with an active heave compensation system for this purpose.

With reference to FIG. 10 now an alternative system for reel laying and J-laying will be described. Same parts have been identified with same reference numerals. Tensioner 40 has been left out for clarity only.

In this embodiment the height between the upper and lower working stations 152 and 160 has been chosen to be identical to the double length pipe section (e.g. 24 meters). This has been done here by arranging the lower workstation (e.g. the coating station) in the moonpool 4 instead of at deck level. Thus the required height difference for simultaneous performing operations on joints in both stations has been created. Obviously this approach is favourable in view of reduction of height of the heavy items (as the tensioners) above deck 3. Also the lower work station is now supported directly on the hull of the vessel, thus reducing the complexity of the tower and its height compared to a version wherein this workstation would be mounted on or along the tower itself.

The J-lay equipment in FIG. 10 has undergone some changes with respect to the equipment shown in FIG. 5. A lower pipeline roller assembly 158 is mounted on the structure 155 below the station 152 in order to maintain the upper end of the launched pipeline in position.

An upper pipeline roller assembly 157 is positioned to laterally support the upper end of the new pipe section. This assembly 157 here is also fitted on the structure 155.

It is envisaged that an accessory, such as PLET 100 or buoy 180, is arranged on an accessory handling device which is adapted to be skidded over the deck, e.g. along or over a rail structure mounted on the deck of the vessel. Preferably the accessory handling device includes a first subframe, which is to be mounted on said rails structure and is slideable along said rail structure, and a second subframe, which is supported by said first subframe so as to be orientable in one or more degrees of freedom with respect to said first subframe, and wherein one or more actuators are provided between said first and said second subframe to allow accurate orientation of said second subframe, preferably including the lowering of the supported accessory onto the top end of the launched pipeline. For instance said second subframe is orientable so as to include an angle with the first subframe, e.g. about one or possible two degrees of angular freedom. Most preferably between the first and second subframes at least three actuators are provided in a spatial arranged, e.g. a triangular or square arrangement, allowing orientation of the second subframe with respect to the first subframe.

An accessory handling device as disclosed above allows to handle and position an accessory without using a vessel crane, which increases efficiency.

Referring now to FIGS. 11-21 a vessel equipped with a preferred embodiment of a marine pipelaying system according to the invention as well as operational methods which can be performed with said vessel will be discussed below.

In as far as parts of the system depicted here are the same or similar to parts described herein before they have been attributed the same reference numerals with the addition of an apostrophe.

A comparison between the vessel 1 in FIGS. 4*a,b* and the vessel 1' in FIGS. 11*a,b* already shows that the tower 20' is located at the bow side of the moonpool 4', basically behind the superstructure 2' of the vessel 1'.

Placing the tower 20' at the bow side of the moonpool 4' has been done in combination with the provision of a clear deck area of the deck 3', extending sternside of the moonpool 4'. As is preferred an area of at least 20 meters length and at least 4 meters width has been provided starting from the sternside of the moonpool 4' in the direction of the stern of the vessel 1'. As will be explained further below in detail it is envisaged that a long accessory to be fitted in or on the end of a pipeline can be laid down on said clear deck area and the erected using the vessel crane 6' and brought alongside the tower 20'.

In this preferred embodiment of the vessel 1' it is envisaged that pipeline storage reels (of all designs) are to be arranged below or on the deck 3', such as the reels 12'. This means that the pipeline to be laid will be guided from said reel along a path which passes alongside the moonpool 4' to the front or bow side of the tower and then upwards to the pipeline guide member 28'.

In the vessel 1' it is envisaged that suitable pipeline guide means provide two paths along each side of the moonpool, whereas the tower 20' is provided with two pipeline guide members 28', each associated with a path. This allows to run pipeline 11' to be laid along one path during pipelaying, while at the same time a pipeline coming from another reel can already be introduced into the other path and raised to the pipeline guide member 28'. The latter is in general a time-consuming activity and thus the provision of two paths and guide members 28' allows for increase of efficiency.

A further advantage of arranging the tower 20' at the bow side of the moonpool 4' follows from the combination with the crane 6' arranged on the deck 3', here along a side of the vessel 1' as is preferred.

As mentioned before the crane 6' has a working range such that crane 6' can lift and hold items alongside the tower 20' above the moonpool 4'. Preferably the crane 6' has a lifting capacity of at least 100 tons at said location. Preferably the crane 6' is provided with an active heave compensation system. Preferably the crane 6' is a mast crane having a stationary mast 6a' mounted on the vessel 1' and a boom 6b' which can be slewed 360 degrees around the mast, with hoisting and topping wires extending between the top of the mast and the boom.

When desired the primary and/or secondary A&R system can be provided with active heave compensation.

FIG. 12 shows that at the top of the tower 20' two pipeline guide members 28' have been mounted, here both of a semi-circular design and both displaceable supported on the tower 20'. This allows to place the pipeline guide member 28' aligned with the pipeline launch trajectory 30' for a range of pipeline diameters, so that a pipeline is guided to its correct trajectory. The displaceability is extended in this example so as to allow for retraction of the guide member 28' when not in use (as is shown in FIG. 12).

FIG. 12 also shows a lower pipeline guide member 200 for each pipeline path, basically diverting the pipeline to be laid from an essentially horizontal path when passing along the moonpool 4' to a vertical upwards part of the path. These lower pipeline guide members 200 here are fitted on the tower 20' as is preferred to avoid obstacles on deck.

Shown in FIGS. 11 and 12 is a set of rails 202 (see FIG. 15) on the deck 3' at the leading to the moonpool 4' and allow the transportation of pipeline accessories 201, here a specific version of pipeline end terminals, to a position over the moonpool 4' over the hatch assembly 60' as shown in FIG. 13.

FIGS. 14-18 show in detail an alternative embodiment of the system as described with reference to FIGS. 11-13, said embodiment allowing the laying of pipeline by J-lay as well as Reel lay (basically similar as described with reference to FIGS. 5-10).

Again the same or similar parts of the system as described with reference to FIGS. 5-10 have been denoted with the same reference numeral with the addition of an apostrophe.

FIG. 14 shows the tower 20' with tensioners 40' and 50' as well as pipe loader 130' with boom structure 131' and pipe section grippers 137'.

The deck 3' is now provided with one or more storage racks 205 for storing double length pipe sections 140'. A transport mechanism, if necessary, allows to bring a pipe section 140 from said rack 205 to a pick-up position on the deck 3', where the pipe loader 130' picks up the pipe section 140' and can then raise it upwards (see broken lines in FIG. 14) to an elevated position along the tower 20'.

As will be clear to the man skilled in the art the pipe loader 130' will not need to have the option of rotation of the pipe gripper assembly 134' about a vertical axis, as the access to the elevated position along the tower 20' from the rear deck 3' is now not obstructed by the tower 20' as in the previous embodiment. This simplifies the pipe loader 130' and operation thereof.

As is shown in FIG. 17 the tower 20' can be tilted forward to obtain an inclined launch position during J-Lay. The pipe loader 130' allows to supply pipe sections 140' to said tower 20' with the tilt range thereof.

In general the system includes a J-lay installation having a welding station 152' or other pipe section joining station (e.g. equipped for screwing pipe section together when provided with such connectors) at a welding position above the lower tensioner 50' and a coating station 160' below said tensioner 40'. Here the station 160' is arranged within the moonpool 4' as discussed before to handle double length pipe section while reducing height of the system and allowing for low position of the tensioners 40', 50' in said system.

FIGS. 15 and 17 indicate the possibility to place the equipment for J-laying in a withdrawn position, here next to a side of the tower 20', so as to clear the space aft of the tower 20' above the moonpool 4'.

FIG. 18 as well as FIG. 19 also show one or more fenders 210, preferably fenders 210 displaceable between a retracted and active position, placed at one or more locations along the tower 20' on the side facing the moonpool 4'. These fenders 210 are preferably mounted at the height of the retractable tensioners 40', 50' in order to protect them from collision with objects, such as a pipeline accessory or other object to be lowered through the moonpool 4'.

With reference to FIGS. 19-21 now the installation of a subsea riser will be explained. As mentioned before risers have been proposed which include a buoyance module. These buoyancy modules support the weight of a substantially vertical riser part extending upwards from the seabed. For deep-sea applications and/or pipe-in-pipe applications this weight can be very large thus requiring buoyancy modules of large volume.

The vessel 1' is highly suitable for installing such risers. When equipped with a free deck space on deck 3' one or more buoyancy modules may be stored on the deck 3'. FIGS. 19-21 show an example of such a module 220. The clear deck space aft of the moonpool 4' allows to prefabricate the buoyancy module 220 on shore, in stead of having to assemble multiple segments of the module during the riser installation process in a step by step fashion. It is preferred that the vessel clear deck space adjoining the moonpool 4' is that that a module having a length in the range of at least 20 meters, e.g. up to 40 meters, can be placed laying down (in suitable cradles) on the deck 3'. A diameter of such a module could e.g. be in the range from 2.5 to 6 meters.

In order to raise the module 220 to its erect position it is proposed to use the crane 6' which is then connected preferably to the end of the module remote from the moonpool 4'. Preferably a tilt cradle is placed at the end of the module near the moonpool 4', so that said cradle forms a fulcrum during the process of erecting the module 220. It is preferred that such a cradle can be installed near the moonpool 4' or even on the hatch 60' closing of the moonpool 4'.

As explained before it is proposed that first the vertical riser part is created using the tower 20' in its J-Lay mode. This riser part 11a' is then suspended from a stationary pipeline support device 70', e.g. in the hatch 60' as is preferred.

Now all tensioners 40' and 50' are retracted to clear the entire moonpool facing side of the tower 20'. The fenders 210 are brought in their active position, here protecting the retracted tensioners 40' and 50'.

Not only the tensioners 40', 50' are retracted but also both pipeline guide members 28' are retracted. This creates free lateral access of the buoyancy module 220 to a position above the moonpool 4' using the crane 6'.

In a preferred embodiment, as shown here, the A&R sheaves 82', 87' are mounted on a retractable support, here a pivotal support structure 240, to allow these sheaves to be retracted from the trajectory 30 and provide clearance, e.g. when placing the module 220 alongside the tower 20'.

In a preferred embodiment (as is shown in FIGS. 19-21) a hoisting bracket 230 is used between the "upper end of" the buoyancy module 220 and the crane 6'. This bracket 230 also allows to connect thereto the A&R wire 81', so that the bracket 230 is used as a load distributing bracket 230. In the practical embodiment shown here the bracket 230 includes two arms 231, 232 and a central pivotal connection 23 to the buoyancy module 220 therebetween. The arm 231 is to be connected to the hook 6d' of the crane 6', whereas the arm 232 here carries a sheave 233 over which the A&R wire 81' is guided to obtain a double fall arrangement of said A&R wire 81'.

Once the module 220 is fitted to the upper end of the launched vertical riser part 11a' the stationary clamping device 70' releases the riser part 11a (here by opening the hatch 60'). Now, using both the crane 6' and the A&R system 80', 81', the assembly is lowered into the sea through the moonpool 4'. This lowering is continued preferably until the assembly is beneath the vessel 1', clear of the moonpool 4', as shown in FIG. 21.

Once the assembly is lowered to a submerged position it is envisaged that the A&R wire 81" is detached from the module 220 (e.g. ROV assisted) and the weight is now suspended from the crane 6' only. It is again noted that the weight is reduced due to the buoyancy of the module 220, and preferably said buoyancy can be controlled by suitable (de-)ballasting of the module 220.

Then the tower 20' is brought into reel-lay mode, and the flexible riser part is created using the reel-lay technique. As explained the end of the flexible riser part can be connected to the submerged vertical riser part using known techniques as using a tie-in wire to pull the end into a suitable connector fitted on the buoy or in the vertical riser part.

In FIG. 22 an alternative pipe installation system is shown in which the vessel supports a tower 300, e.g. at the stern or adjacent a moonpool. The system here includes multiple, in this example two tensioners 310 and 320. These tensioners 310, 320 are arranged on a common support assembly 330, which common support assembly 330 is displaceable supported by the tower 300. Here the support assembly 330 is hinged about a horizontal pivot axis 331 with respect to the tower 300. The tensioners 310, 320 are preferably mounted stationary with respect to said common support assembly. The tilting of the support assembly 330 allows to displace the tensioners 310, 320 between their active position and a retracted position (as shown in FIG. 22).

The tower 300 preferably is equipped with J-lay equipment (not shown here). This allows to use the system both for Reel laying and J-lay.

Preferably the tower 300 is associated with a hoisting arrangement, including a winch 350 and a sheave arrangement 351 at an elevated position in said tower, preferably above the level of the tensioners 310, 320, for a hoist wire 352.

Said hoisting device 350, 351, 352 could preferably include a mobile clamp (not shown) for supporting the pipeline during J-lay, preferably at the top end thereof as is common for J-lay.

One or more workstations (not shown) associated with J-lay are preferably arranged on said tower 300. The same goes e.g. for an alignment device for aligning a new pipe section with the launched pipeline during J-Lay. As mentioned before such workstations and other J-lay equipment is preferably arranged in a mobile manner on said tower 300, so as to be displaceable between an active and retracted position.

The common support assembly 330 here, as is preferred, also includes the pipeline guide 340 for guiding pipeline coming from a reel. In this example, as is also preferred, the common support assembly 330 also includes an A&R sheave arrangement 360, which guides an A&R wire from A&R winch 361 to a reel lay firing line defined by the tensioners 310, 320.

FIG. 22 also shows hang-off clamp 365 arranged on the vessel, here supported directly by the hull of the vessel. It is an option, although not directly preferred, that said clamp 365 is embodied as a tensioner.

The tilting of the common support assembly 330 can be effected by an adjuster device (not shown) arranged between the tower 300 and the assembly 330. Tilting of the tower is done by an adjuster device arranged between the vessel and the tower 300.

It will be appreciated that said common support assembly 330 for multiple tensioners 310, 320 could also be mounted in a different manner onto said tower 300, e.g. translating or rotating about a vertical axis.

When the common support assembly 330 is tilted to its retracted position a large clear envelope is created along the tower 300, which can be used for e.g. positioning an large accessory above the end of a launched pipeline held by the clamp 365. The winch 350 and a sheave arrangement 351 and associated hoisting wire 352 can then e.g. be used to lower said accessory when connected to said pipeline.

In a practical embodiment the tower 300 could include two main beams between which the movable common support assembly 330 is mounted, here as a pivotal structure hinged to said main beams of the tower 300. A top cross beam of the tower 300 could interconnect the main beams at an elevated position.

The system of FIG. 22 can also be envisaged in a version without tensioners for supporting the weight of the launched pipeline, e.g. when employed for installing rather light pipes, cables, umbilicals, etc. In said version it can be envisaged that the support assembly 330 is provided with one or more pipe clamp or similar pipeline support devices of the type which do not allow travel of the active clamping parts along with the pipeline held thereby such as in a tensioner. An example is a pipeline clamp having friction pads which are not mobile in the direction of the pipeline.

In a practical embodiment one or more pipeline clamps or the like are mounted on support 330 instead of the tensioner(s) shown here, as well as the pipeline guide 340 at the top end of the support 330.

The tower 300 could be adapted to support an accessory when the tower is in tilted orientation, so that the accessory can be rested on said tower with the support assembly in retracted position. Preferably the tower then has guide surfaces along which the accessory can slide when it is lowered into the sea.

In general terms, not only related to the FIG. 22, the present invention also envisages alternative systems and methods wherein instead of the tensioner(s) referred to in this application and claims a pipeline clamp or pipeline support device of the type which does not allow travel of the active clamping parts along with the pipeline held thereby is meant. One can easily envisage that e.g. for laying less heavy pipelines and/or in shallower conditions, no tensioner(s) is needed and the same function can be performed by a different device. Again the possibility to retract and/or remove such device will be advantageous for the reasons disclosed herein with respect to the retraction and/or removal of tensioners. As such the invention also covers systems and method according to the appended claims wherein the tensioner is substituted in the manner suggested in this paragraph.

FIG. 23 depicts schematically a part of a vessel 400 having a moonpool 401 through which pipeline installation can be performed, at least according to the reel lay method, but preferably also according to the J-lay method.

The vessel 400 includes one or more storage reels (not shown here) for storage of pipeline to be installed. A pipeline launch tower 402 is placed on said vessel, adjacent a side of the moonpool 401.

In this embodiment the tower 402 is provided with a pipeline guide 403 at an elevated position for guiding pipeline from the reel to a pipeline launch trajectory along said tower 402.

The tower 402 here is tiltable about a horizontal tilt axis 404 near the lower end of the tower. An adjuster device 405 is provided for said purpose.

For reel laying pipeline the system includes one or more tensioners, here an upper and lower tensioner 410, 420.

The tensioners 410, 420 are in this embodiment not supported by the tower 402, but by a tensioner support assembly 430. This tensioner support assembly here is distinct from said tower 402 and supported on the vessel independently from the tower 402.

In this example the support assembly 430 is arranged at another side of the moonpool 401, here at the side opposite to the tower 403.

As visible in FIG. 23 the support assembly 430 supports both tensioners 410, 420.

The tensioner support assembly 430 is adapted to allow for displacement of the tensioner frames supported thereby between an active position, wherein the pipeline launch trajectory extends through the tensioner frame between the tracks (see FIG. 23), so that the tracks can engage on a pipeline, and a retracted and non-operable position, wherein the space above the moonpool 401 is cleared.

As will be apparent to the man skilled in the art the tensioner support assembly 430 can be adapted to be tilted or pivoted to displace the one or more supported tensioners 410, 420 between their retracted and active position. As an alternative, or in combination with tilting or pivoting, the tensioner support assembly 430 can be adapted to be translated to displace the supported tensioners 410, 420 between their retracted and active position. Arrows in FIG. 23 suggest these motions in an embodiment wherein the support assembly 430 has a base 430a essentially displaceable along the deck (e.g. on rails or otherwise) and a tiltable ramp 430b supporting both tensioners 410, 420.

It is noted that as preferred the tower 402 is provided with a hoisting device, including a winch 440, upper sheave arrangement 441 and a main hoisting wire 442, e.g. as explained with reference to FIG. 22, possibly including active heave compensation.

It will be appreciated that the system of FIG. 23 can be used for reel laying pipeline with the tensioners 410, 420 in their active position above the moonpool 401.

For supporting the launched pipeline, primarily when the tensioners 410, 420 are retracted, pipeline support device 450 is provided. It is here suggested that said device 450 is arranged on a translatable cantilever 451, e.g. sliding underneath the tower 402.

As suggested before it can be envisaged that the tower 402 is or can be provided with J-lay equipment for performing J-lay operations.

The system allows to bring large size accessories in position above the moonpool 401 when the tensioners 410, 420 are retracted. The hoisting capability of the tower 402 is available to aid in placing and/or lowering of the accessory. Also the hoisting capability of the tower 402 can be used in the course of J-laying.

It can be envisaged that during lay operations said tower 402 and tensioner support assembly arranged remote from said tower, e.g. along another side of the moonpool, are interconnected by braces to obtain an increased load bearing capability of the structure.

It is noted that in an alternative embodiment the tower 402 and tensioner support assembly are arranged at the same side of the pipeline launch location, e.g. when placed along the stern, bow or side of the vessel. Then it can be envisaged that the tower extends as a sort of two legged bridge structure, or A-frame, over the tensioner support structure. The tower and tensioner support structure are then each independently supported on the hull of the vessel.

In the above it has been described a "clear envelope" is created along the tower of the vessel, e.g. for locating an accessory and/or for performing J-lay, by arranging one or more tensioners in a retractable manner on a support assembly. Said assembly either transfers the load supported by the tensioner when in use to the tower or directly to the vessel hull (e.g. in the FIG. 23 embodiment).

The present invention also envisages an embodiment of the system, wherein the clear envelope is created by removing the one or more tensioners from the tower (or their tower independent support assembly). It is noted that in prior art systems removal of tensioners is not performed in the course of a pipeline installation process. Normally removal is only done when at a shipyard for repair and/or renovation of the tensioner.

In the vessel depicted e.g. in FIGS. 1-20 the crane 6 could be used to lift the tensioners from their position in the tower when desired and place them at a suitable storage location on the deck.

In an alternative the A&R system could be used to effect the removal and replacing of a tensioner, e.g. by lowering the tensioner onto a transport device temporarily arranged below the tensioner, e.g. above the moonpool. This transport device, e.g. a skiddable frame, could then be used to transport the tensioner over the deck to a storage location.

To enhance the process of removal and/or replacement of a tensioner during a pipeline installation process it can be envisaged to provide the marine pipeline installation system having one or more removable tensioners with operable connection means with attach the tensioner frame to the tower or other support structure, e.g. slideable connector pins, possibly with associated (hydraulic) actuators to allow for power operated displacement thereof.

Thus the present invention also provides for a pipeline installation method, at least including the reel lay method, wherein use is made of one or more pipeline tensioners supported by a tower or other tensioner support assembly, wherein during the course of a pipeline installation process one or more tensioners are removed from their active position, e.g. using a crane, and stored at a suitable storage location.

The present invention also envisages a method as above wherein furthermore J-lay equipment is provided, and said one or more tensioners are removed from their active position to create space for the placement of J-lay equipment on or along said tower.

A method is proposed wherein a pipeline is installed containing a pipeline part realised by pipeline coming from a reel using the reel lay method, and a further part realised by the J-lay method wherein sections of pipeline are added sequentially to the launched pipeline, said one or more tensioners being employed during reel laying in their active position, and at least one, possibly all tensioners being removed while performing J-lay.

As mentioned before the removal of one or more tensioners from the pipeline launch trajectory, possibly by literally disconnecting and relocating the one or more tensioners, is performed to create a clear envelope along at least a part of said tower, into which clear envelope an accessory can be introduced, which accessory is then connected to the pipeline.

The present invention also relates to a method for installing a subsea riser of the type wherein an essentially vertical riser part extends upward from the seabed to a submerged buoy, and a further catenary riser part extends from said buoy to a floating object, wherein use is made of a system including one or more tensioners and a pipeline support device arranged below said one or more tensioners, which method comprises the steps of:

retracting or removing one or more tensioner from their active position thereby creating a clear envelope;

bringing J-lay equipment in its active position thereby occupying at least some of the clear envelope created by retraction or removal of said one or more tensioners;

creating the vertical riser part using the J-Lay technique;

suspending the upper end of the vertical riser part by the pipeline support device;

retracting or removing the J-lay equipment from its active position;

when necessary retracting a further tensioner, possibly all tensioners, to create a clear envelope after which the buoy is brought into said clear envelope above the upper end of the launched vertical riser part;

connecting the buoy to said upper end;

lowering the assembly of the buoy and vertical riser part;

bringing said one or more tensioners into active position;

effecting reel lay using the one or more tensioners in order to create the catenary riser part from the buoy to the floating object.

The invention claimed is:

1. A marine pipeline installation system for laying an offshore pipeline and/or installing a subsea riser, said system at least being adapted to carry out the reel lay method, wherein the system comprises:
   one or more storage reels for storage of a pipeline to be installed;
   a pipeline launch tower adapted for launching the pipeline into the sea;
   a pipeline guide at an elevated position for guiding said pipeline to a pipeline launch trajectory along said tower; and
   one or more tensioners supported by said tower, each tensioner comprising a tensioner frame and multiple tracks supported by said tensioner frame, said tracks being adapted for engaging the pipeline and supporting at least part of the weight of the launched pipeline,
   wherein the tensioner frame is supported by said tower via an associated support assembly,
   wherein the support assembly of at least one tensioner frame supported by said tower is adapted to allow for displacement of the tensioner frame with respect to the tower between an active position, wherein the pipeline launch trajectory extends through the tensioner frame between the tracks, so that the tracks can engage on a pipeline, and a retracted position, and
   wherein the tower is pivotable to adjust inclination of the tower.

2. The system according to claim 1, wherein in the retracted position of the tensioner frame a clear envelope is present around the pipeline launch trajactory having a minimum distance to said tensioner of at least one meter.

3. The system according to claim 1, further comprising a pipeline support device arranged below said one or more tensioners and adapted to support the weight of the launched pipeline.

4. The system according to claim 1, further comprising one or more actuators for displacing the tensioner frame between the active and retracted position.

5. The system according to claim 1, wherein a tensioner frame is supported by parallel bar linkage on the tower.

6. The system according to claim 1, wherein the tower has a docking station for receiving a tensioner frame in its retracted position.

7. The system according to claim 1, wherein the tower comprises two spaced apart main beams interconnected by a number of cross beams, and wherein the one or more tensioners in their retracted position are located at least partly between said main beams.

8. The system according to claim 1, further comprising a vessel on which said tower is arranged.

9. The system according to claim 8, wherein said vessel has a moonpool and the marine pipelaying system is adapted to lay a pipeline through said moonpool.

10. The system according to claim 1, wherein at least one abandonment and recovery (A&R) sheave is provided at a location above said one or more tensioners, and wherein an associated A&R winch and A&R wire are provided, said A&R sheave being arranged such that said A&R wire can extend along said pipeline launch trajectory.

11. The system according to claim 1, further comprising a J-Lay installation, which J-Lay installation comprises:
   a pipe loader for sequentially supplying pipe sections to an elevated position aligned with the pipeline launch trajectory;
   a pipe section alignment device for aligning a pipe section with the upper end of the previously launched pipeline; and
   a pipe section work station for connecting the pipe section to the launched pipeline.

12. The system according to claim 11, wherein said system includes multiple tensioners, and wherein for J-Lay operation at least one tensioner is moved to its retracted position, and wherein the pipe section alignment device and pipe section work station are adapted to be placed essentially at the height of said retracted tensioner.

13. The system according to claim 12, wherein said pipe section alignment device and/or said pipe section work station are mounted on said tower so as to be displaceable between an active and retracted position.

14. The system according to claim 11, wherein for J-Lay operation one or more lower tensioners are held in their active position engaging on the pipeline, and wherein an associated control device is configured to allow for stepwise lowering of said pipeline.

15. The system according to claim 11, wherein a pipeline workstation is provided below the lowermost tensioner at a location independent from said tower.

16. The system according to claim 1, wherein the vessel includes a moonpool, and a pipeline work station is adapted to be arranged in said moonpool.

17. A method for installing an offshore pipeline and/or subsea riser comprising the step of using the system according to claim 1.

18. A method for installing a subsea riser of the type wherein an essentially vertical riser part extends upward from the seabed to a submerged buoy, and a further catenary riser part extends from said buoy to a floating object, said method comprising the steps of:
   using the system according to claim 1;
   retracting the upper tensioner;
   bringing the J-lay equipment in its active position above the lower tensioner;
   creating the vertical riser part using the J-Lay technique;
   suspending the upper end of the vertical riser part by the pipeline support device;
   retracting at least the lower tensioner, possibly both or all tensioners, to create a clear envelope after which the buoy is brought into said clear envelope above the upper end of the launched vertical riser part;
   connecting the buoy to said upper end;
   lowering the assembly of the buoy and vertical riser part;
   effecting reel lay using the system in order to create the catenary riser part from the buoy to the floating object.

19. The system according to claim 1, wherein the pipeline launch tower includes a pair of main vertical beams having a pivot structure at a bottom thereof to pivotably mount the pair of main vertical beams to a deck of a vessel, and the tensioner frame in the retracted position is located between the pair of main vertical beams.

20. The system according to claim 1, wherein in the active position, the tensioner frame is located at a spaced location from the tower, and in the retracted position, the tensioner frame is located in overlapping relationship to the tower.

* * * * *